(12) United States Patent
Dalton et al.

(10) Patent No.: US 12,378,368 B2
(45) Date of Patent: Aug. 5, 2025

(54) COMPOSITE MATERIALS MADE FROM PICKERING EMULSIONS

(71) Applicants: THE UNIVERSITY OF SUSSEX, Brighton (GB); ALLIANCE RUBBER COMPANY, Hot Springs, AR (US)

(72) Inventors: Alan Dalton, Brighton (GB); Matthew Large, Brighton (GB); Sean Ogilvie, Brighton (GB); Marcus O'Mara, Brighton (GB)

(73) Assignees: The University of Sussex, Brighton (GB); Alliance Rubber Company, Hot Springs, AR (US)

( * ) Notice: Subject to any disclaimer, the term of this patent is extended or adjusted under 35 U.S.C. 154(b) by 743 days.

(21) Appl. No.: 17/635,244

(22) PCT Filed: Aug. 14, 2020

(86) PCT No.: PCT/GB2020/051958
§ 371 (c)(1),
(2) Date: Feb. 14, 2022

(87) PCT Pub. No.: WO2021/028702
PCT Pub. Date: Feb. 18, 2021

(65) Prior Publication Data
US 2022/0289913 A1    Sep. 15, 2022

(30) Foreign Application Priority Data

Aug. 14, 2019  (GB) ..................... 1911629

(51) Int. Cl.
*C08J 3/05* (2006.01)
*C08J 3/09* (2006.01)
*C08K 3/04* (2006.01)

(52) U.S. Cl.
CPC . *C08J 3/05* (2013.01); *C08J 3/09* (2013.01); *C08K 3/042* (2017.05); *C08J 2383/06* (2013.01)

(58) Field of Classification Search
CPC ... C08J 3/05; C08J 3/09; C08J 2383/06; C08J 2383/05; C08J 3/092; C08K 3/042
See application file for complete search history.

(56) References Cited

U.S. PATENT DOCUMENTS 3,989,668 A    11/1976  Lee et al.
4,562,238 A    12/1985  Kondo et al.
(Continued)

FOREIGN PATENT DOCUMENTS

CN    103627179 A        3/2014
CN    106750335 A    *   5/2017
(Continued)

OTHER PUBLICATIONS

Yang, CN106750335—MT (Year: 2017).*
(Continued)

*Primary Examiner* — Peter F Godenschwager
*Assistant Examiner* — Zhen Liu
(74) *Attorney, Agent, or Firm* — Meunier Carlin & Curfman LLC

(57) ABSTRACT

The present invention relates to a method of making a composite material, the method comprising: (1) forming a Pickering emulsion comprising a continuous liquid phase, a discontinuous liquid phase, and a 2D material; wherein the discontinuous liquid phase comprises a polysiloxane and a curing agent; (2) leaving the Pickering emulsion formed in step (1) in a sealed system for sufficient time to at least partially cure the polysiloxane; and (3) allowing any remaining liquid to evaporate.

20 Claims, 13 Drawing Sheets

(56) References Cited

U.S. PATENT DOCUMENTS

| | | | |
|---|---|---|---|
| 6,428,796 B1 | 8/2002 | Gers-Barlag et al. | |
| 9,646,735 B2 | 5/2017 | Adamson et al. | |
| 10,832,828 B2 | 11/2020 | Adamson et al. | |
| 2003/0003122 A1* | 1/2003 | Gers-Barlag | A61K 8/06 424/401 |
| 2007/0264481 A1* | 11/2007 | DeSimone | A61K 9/5138 977/773 |
| 2010/0234230 A1* | 9/2010 | Fowler | A01N 37/22 504/342 |
| 2011/0178224 A1 | 7/2011 | Pan et al. | |
| 2012/0007913 A1 | 1/2012 | Jang et al. | |
| 2014/0120339 A1* | 5/2014 | Nikova | B01J 20/20 428/221 |
| 2015/0299240 A1 | 10/2015 | Cheng et al. | |
| 2016/0287175 A1 | 10/2016 | Coleman et al. | |

FOREIGN PATENT DOCUMENTS

| | | | |
|---|---|---|---|
| CN | 106750355 A | 5/2017 | |
| CN | 110003657 A | 7/2019 | |
| IN | 105623136 A | 6/2016 | |
| JP | H02-233508 A | 9/1990 | |
| JP | 2004-172200 A | 6/2004 | |
| JP | 2013-100408 A | 5/2013 | |
| JP | 2016-515090 A | 5/2016 | |
| JP | 2016-128497 A | 7/2016 | |
| WO | WO-2013076296 A1 * | 5/2013 | ............ C08J 3/2056 |
| WO | 2014140324 A1 | 9/2014 | |
| WO | 2019/135094 A1 | 7/2019 | |

OTHER PUBLICATIONS

International Search Report and Written Opinion issued for Application No. PCT/GB2020/051958, dated Oct. 9, 2020, 9 pages.

Search Report issued for Application No. GB1911629.2, dated Feb. 12, 2020, 4 pages.

Boland, Conor S., et al. "Sensitive electromechanical sensors using viscoelastic graphene-polymer nanocomposites." Science 354.6317 (2016): 1257-1260.

Woltornist, Steven J., et al. "Conductive thin films of pristine graphene by solvent interface trapping." ACS nano 7.8 (2013): 7062-7066.

Woltornist, Steven J., et al. "Controlled 3D assembly of graphene sheets to build conductive, chemically selective and shape-responsive materials." Advanced Materials 29.18 (2017): 1604947.

Woltornist, Steven J., et al. "Polymer/pristine graphene based composites: From emulsions to strong, electrically conducting foams." Macromolecules 48.3 (2015): 687-693.

Woltornist, Steven J., and Douglas H. Adamson. "Properties of pristine graphene composites arising from the mechanism of graphene-stabilized emulsion formation." Industrial & Engineering Chemistry Research 55.24 (2016): 6777-6782.

Bento, Jennifer L., et al. "Thermal and Electrical Properties of Nanocomposites Based on Self-Assembled Pristine Graphene." Advanced Functional Materials 27.1 (2017): 1604277.

* cited by examiner

Figure 2

| Solvent | Pentane | Hexane | Ethyl acetate | Cyclohexane | Chloroform | Dichloromethane | MMA | Styrene | CPO | CHO | CHP | NMP | Ethylene glycol | Diethylene glycol | Formamide | Glycerol | Water |
|---|---|---|---|---|---|---|---|---|---|---|---|---|---|---|---|---|---|
| Surface tension | 15 | 19 | 23 | 25 | 27 | 28 | 28 | 32 | 33 | 34 | 35 | 41 | 47 | 55 | 57 | 64 | 72 |
| Pentane | | | | | | | | | | | | | | | | | |
| Hexane | 0 | | | | | | | | | | | | | | | | |
| Ethyl acetate | 0 | 0 | | | | | | | | | | | | | | | |
| Cyclohexane | 0 | 0 | 0 | | | | | | | | | | | | | | |
| Chloroform | 0 | 0 | 0 | 0 | | | | | | | | | | | | | |
| Dichloromethane | 0 | 0 | 0 | 0 | 0 | | | | | | | | | | | | |
| MMA | 0 | 0 | 0 | 0 | 0 | 0 | | | | | | | | | | | |
| Styrene | 0 | 0 | 0 | 0 | 0 | 0 | 0 | | | | | | | | | | |
| CPO | 0 | 0 | 0 | 0 | 0 | 0 | 0 | 0 | | | | | | | | | |
| CHO | 0 | 0 | 0 | 0 | 0 | 0 | 0 | 0 | 0 | | | | | | | | |
| CHP | 0 | 0 | 0 | 0 | 0 | 0 | 0 | 0 | 0 | 0 | | | | | | | |
| NMP | 1 | 1 | 0 | 0 | 0 | 0 | 0 | 0 | 0 | 0 | 0 | | | | | | |
| Ethylene glycol | 1 | 1 | 1 | 1 | 1 | 1 | 1 | 1 | 0 | 0 | 0 | 0 | | | | | |
| Diethylene glycol | 1 | 1 | 0 | 1 | 0 | 0 | 0 | 1 | 0 | 0 | 0 | 0 | 0 | | | | |
| Formamide | 1 | 1 | 0 | 1 | 1 | 1 | 1 | 1 | 0 | 0 | 0 | 0 | 0 | 0 | | | |
| Glycerol | 1 | 1 | 1 | 1 | 1 | 1 | 1 | 1 | 1 | 1 | 0 | 0 | 0 | 0 | 0 | | |
| Water | 1 | 1 | 1 | 1 | 1 | 1 | 1 | 1 | 1 | 1 | 0 | 0 | 0 | 0 | 0 | 0 | |

Figrue 16

COMPOSITE MATERIALS MADE FROM PICKERING EMULSIONS

CROSS-REFERENCE TO RELATED APPLICATIONS

This application is a United States National Phase Patent Application of International Patent Application Number PCT/GB2020/051958, filed on Aug. 14, 2020, which claims the benefit of priority to Application No. 1911629.2 (GB), filed Aug. 14, 2019, which is incorporated by reference herein in its entirety.

FIELD OF THE INVENTION

The present invention relates to composite materials made from Pickering emulsions comprising a two-dimensional (2D) material, a polysiloxane (silicone) and a curing agent, and to methods of making such materials.

BACKGROUND OF THE INVENTION

A composite (or hybrid) material is a solid material made from two or more constituent materials with significantly different physical or chemical properties that, when combined, produce a material with characteristics different from the individual components. The individual components remain separate and distinct within the finished structure, differentiating a composite material from mixtures and solid solutions.

Composite materials can therefore combine the desirable properties of the constituent materials to make new materials that may be preferable to traditional, non-composite materials for a variety of reasons. For example, composite materials may be stronger, lighter, and/or less expensive than traditional materials.

Composite materials may be considered to comprise a matrix or continuous phase, and a filler or discontinuous phase. For example, concrete is a composite material typically comprising loose stones or aggregate (i.e. a filler) held within a matrix of cement. Other composite materials include ceramic matrix composites, which contain ceramic fibres (such as silicon carbide fibres) embedded in a ceramic matrix (such as silicon carbide).

The nature and structure of the filler or discontinuous phase heavily influences the final properties of the composite material. More recently, work has focused on using layered two-dimensional (2D) materials, such as graphene, as fillers in composite materials, due to their interesting and potentially useful properties. For example, graphene has high thermal and electrical conductivity.

Polysiloxane elastomers, also known as silicone elastomers, are a class of flexible, lightweight, thermally-stable and chemical-resistant polymers. Due to their favourable properties, polysiloxane elastomers have a wide range of uses. For example, polysiloxane elastomers can be used to form moulds for casting other materials, seals, cookware, and medical implants. As such, it is desirable to produce composite materials where the properties of silicone elastomers are modified or enhanced by the addition of a filler material such as graphene.

The easiest and most common method of forming a composite material simply comprises blending the filler and the matrix, which leads to a material having a uniform distribution of filler particles. If this approach is used for 2D filler materials such as graphene, the 2D material will be randomly orientated in the matrix.

For example, Boland et al. (*Science*, 2016, vol. 354, issue 6317, pp 1257-1260) discloses a process comprising forming graphene nanosheets, and mixing said nanosheets with homemade "Silly Putty" (a lightly cross-linked highly viscoelastic polysiloxane).

Similarly, US 2011/0178224 discloses a process comprising dispersing functional graphene sheets in a polar solvent, adding a vinyl-terminated polysiloxane, removing the solvent, adding a crosslinker and a hydrosilylation catalyst, and curing the resulting mixture to provide a nanocomposite composition comprising a silicone elastomer matrix and functional graphene sheets as a filler.

However, the chemical resistance of silicones makes formation of composite materials challenging, due to the difficulty in blending the graphene with any control over structure. The processes disclosed in Boland et al. and US 2011/0178224 do not allow for any control over the integration of the 2D material into the elastomer, and as such the 2D material will be randomly distributed and orientated through the matrix.

US 2016/0287175 discloses a process for forming conductive composites comprising soaking an elastomer in a solution of a conductive 2D material such as graphene and applying energy to incorporate the 2D material into the elastomer. However, this process also does not allow for control over the integration of the 2D material into the elastomer, and as a result the 2D material will also be randomly distributed and orientated through the matrix.

It would therefore be desirable to provide a method of forming a composite material containing a polysiloxane elastomer and a 2D material, wherein the 2D material is integrated into the matrix in a controlled way, leading to enhanced properties of the composite material.

SUMMARY OF THE INVENTION

In one aspect, the present invention provides a method of making a composite material, the method comprising:
(1) forming a Pickering emulsion comprising a continuous liquid phase, a discontinuous liquid phase, and a 2D material; wherein the discontinuous liquid phase comprises a polysiloxane and a curing agent;
(2) leaving the Pickering emulsion formed in step (1) in a sealed system for sufficient time to at least partially cure the polysiloxane; and
(3) allowing any remaining liquid to evaporate.

In another aspect, the present invention is directed to a composite material obtainable by or formed by the above method.

In another aspect, the present invention is directed to a strain sensor comprising the above composite material or a composite material formed by the above method.

In another aspect, the present invention is directed to a pressure sensor comprising the above composite material or a composite material formed by the above method.

In another aspect, the present invention provides a method of making a composite material, the method comprising:
(1) forming a Pickering emulsion comprising a continuous liquid phase, a discontinuous liquid phase, and a 2D material; wherein the continuous liquid phase comprises a polysiloxane and a curing agent;
(2) allowing the polysiloxane to at least partially cure.

In another aspect, the present invention is directed to a Pickering emulsion comprising a continuous liquid phase, a discontinuous liquid phase, and a 2D material; wherein the continuous liquid phase comprises a polysiloxane and a curing agent.

In the above aspects, a preferred polysiloxane is PDMS.
In the above aspects, a preferred 2D material is graphene.

LIST OF FIGURES

FIG. 2 is a table which indicates whether a range of liquid phases are immiscible or miscible with each other.

DETAILED DESCRIPTION OF THE INVENTION

Pickering Emulsions

As is well known in the art, an emulsion is a mixture of two or more immiscible liquids, where droplets of one liquid (the dispersed or discontinuous phase) are dispersed in the other liquid (the continuous phase). Examples of emulsions include vinaigrettes, homogenized milk and mayonnaise. Emulsions often comprise surfactants, which act to stabilise the emulsion by increasing its kinetic stability. Surfactants generally have a polar or hydrophilic part, and a non-polar or hydrophobic part. The surfactant molecules orientate themselves with the polar portion towards the more polar liquid phase, and the non-polar portion towards the less polar liquid phase. They therefore form a layer between the dispersed and continuous phases, which helps stabilise the emulsion.

Figure 1:
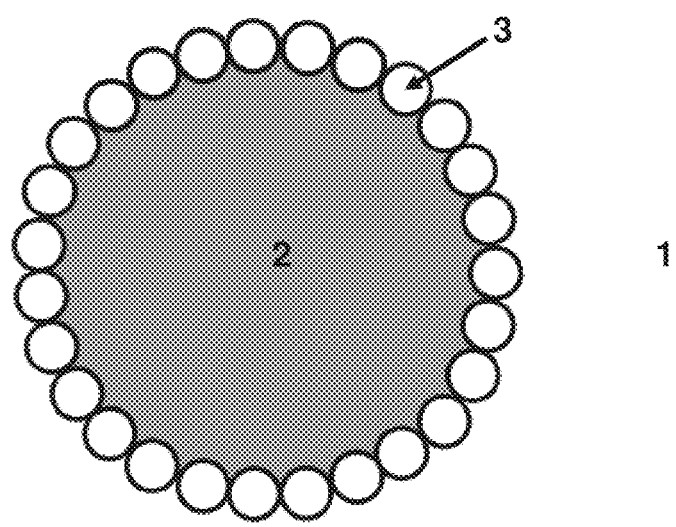
FIG. 1 is a schematic illustration of a droplet within a Pickering emulsion.

In contrast, a Pickering emulsion is an emulsion that is stabilised by solid particles, which adsorb at the interface between two liquid phases in the emulsion. FIG. 1 shows a solid-stabilised droplet within a Pickering emulsion, comprising a continuous phase (1) and a dispersed (discontinuous) phase (2), and solid particles (3) which form a layer or interface between the two phases.

2D Material

The 2D material used in the present invention acts as a solid stabiliser in the Pickering emulsion.

The 2D material used in the present invention may be any 2D material which is not a silicate and which is unfunctionalised. Graphene oxide and silicates, including silica, clays, functionalised clays, and surface modified clays, are not therefore included in the definition of suitable 2D materials for use in the present invention.

Suitable unfunctionalised 2D materials for use in the present invention include graphene, borophene, germanene, silicene, stanene, phosphorene, bismuthene, hexagonal boron nitride (h-BN), MXenes, 2D perovskites and transition metal dichalcogenides (TMDs). TMDs have the formula $MX_2$, wherein M is a transition metal and X is a chalcogen atom (S, Se or Te). Examples of TMDs include molybdenum disulphide ($MoS_2$), molybdenum diselenide ($MoSe_2$), molybdenum ditelluride ($MoTe_2$), niobium diselenide ($NbSe_2$), tungsten disulphide ($WS_2$), tungsten diselenide ($WSe_2$) and hafnium disulphide ($HfS_2$). MXenes are 2D materials consisting of layers of transition metal carbides, nitrides or carbonitrides which are a few atoms thick. Examples include $Ti_2C$, $V_2C$, $Nb_2C$, $Mo_2C$, $Ti_3C_2$, $Ti_3CN$, $Zr_3C_2$, $Hf_3C_2$, $Ti_4N_3$, $Nb_4C_3$, $Ta_4C_3$, $Mo_2TiC_2$, $Cr_2TiC_2$ and $Mo_2Ti_2C_3$.

The skilled person will recognise that the 2D material can be selected to provide the desired properties of the material formed from the Pickering emulsion. For example, graphene may be selected to provide electrical conductivity. Alternatively, hexagonal boron nitride may be selected to provide thermal conductivity. Other 2D materials such as molybdenum disulphide and tungsten disulphide are semiconductors.

The 2D material is an unfunctionalised or pristine 2D material. By unfunctionalised or pristine it is meant that the 2D material has not undergone any surface modification in order to change its surface tension. The term "unfunctionalised 2D material" therefore excludes, for example, graphene oxide.

Preferably, the 2D material is graphene, hexagonal boron nitride (h-BN), phosphorene or a transition metal dichalcogenide (TMD), more preferably graphene, hexagonal boron nitride or molybdenum disulphide. Most preferably, the 2D material is graphene.

As would be understood by the skilled person, in order to form a Pickering emulsion, the 2D material should have a surface tension which lies between that of the two liquid phases.

The surface tension of 2D materials can be estimated using known techniques, such as known from Hernandez et al., *Langmuir*, 2010, 26 (5), 3208-3213 and Hernandez et al., *Nat. Nanotechnol*, 2008, 3(9), 563-568. This technique is based on the maximum achievable concentrations of the material in dispersion. The surface tensions of various 2D materials are known in the art. For example, the surface tension of graphene is estimated to be in the range of about 41 to about 43 mN/m. The surface tensions of most 2D materials are similar. Preferably, the surface tension of the 2D material ranges from about 40 to about 45 mN/m.

The amount of 2D material that should be present in the Pickering emulsion may depend on the size of the droplets of the dispersed phase within the emulsion, the total volume of the dispersed phase, the nature of the 2D material and/or the nature of the liquid phases.

The particles of the 2D material are generally present in the Pickering emulsion in an amount sufficient to form a monolayer of particles around each of the droplets of the dispersed phase. Thus, in general, for a given volume of dispersed phase, a larger amount of 2D material will be required the smaller the size of the droplets of the dispersed phase.

The Pickering emulsions formed herein may be formed by firstly exfoliating a layered 3D material to form a 2D material and secondly forming a Pickering emulsion stabilised by said 2D material. By exfoliating the layered 3D material before forming the emulsion it is possible to ensure that the 3D material is well exfoliated (i.e. that the 2D material formed consists of particles of 2D material no more than a few layers thick) before an emulsion is formed. Since the particles of 2D material are no more than a few layers thick, it is possible to form a monolayer of particles of 2D material around each of the droplets of the dispersed phase in the emulsion using less 2D material than would be required when each of the particles of 2D material comprises more layers of 2D material.

In this context, a few layers means 1 to about 10, preferably 1 to about 5, and more preferably 1 layer of atoms or formula units. Thus, it is preferred that the particles of 2D material are 1 to about 10, preferably 1 to about 5, and more preferably 1 layer of atoms or formula units thick.

Alternatively, the 2D material may be commercially available. For example, graphene and 2D boron nitride can be obtained commercially from Thomas Swan & Co. Ltd.

The 2D material is generally present in the Pickering emulsion in an amount of less than about 15 vol. %, more preferably less than about 10 vol. %, most preferably less than about 5 vol. %, based on the volume of the dispersed phase. Generally, the 2D material is present in the Pickering emulsion in an amount of at least about 0.001 vol. % based on the volume of the dispersed phase, such as from about 0.01 to about 15 vol. %, preferably from about 0.05 to about 10 vol. %, most preferably from about 0.1 to about 5 vol. %.

The vol. % of 2D material may be calculated by measuring the mass (as measured by weighing or by extinction spectroscopy) of 2D material present prior to formation of the emulsion. This is divided by the density of the bulk 3D material to give the volume of 2D material. This is then divided by the volume of the dispersed phase and expressed as a percentage by multiplying by 100. For example, 0.225 mg of graphene may be formed in 1 mL of cyclohexanone, after which 1 mL of water is added and a Pickering emulsion formed wherein water forms the dispersed phase. In this example, the volume of graphene is 0.000225 g/2.25 g/mL=0.0001 mL (the density of graphite is 2.25 g/mL). The vol. % of graphene based on the volume of dispersed phase (in this case water) is (0.0001/1)*100=0.01 vol. %.

Alternatively, the 2D material is generally present in the Pickering emulsion in an amount of less than about 30 vol. %, more preferably less than about 20 vol. %, most preferably less than about 15 vol. %, based on the volume of the polysiloxane and the curing agent. Generally, the 2D material is present in the Pickering emulsion in an amount of at least about 0.1 vol. % based on the volume of the polysiloxane and the curing agent, such as from about 0.1 to about 30 vol. %, preferably from about 0.25 to about 20 vol. %, most preferably from about 0.5 to about 15 vol. %.

Alternatively, the amount of 2D material may be expressed as a weight percent, calculated as the weight of 2D material divided by the weight of the dispersed phase (which can be calculated using the volume and density of the dispersed phase). In this case, the 2D material is generally present in the Pickering emulsion in an amount of less than about 30 wt. %, more preferably less than about 20 wt. %, more preferably less than about 15 wt. %, most preferably less than about 10 wt. %, based on the weight of the dispersed phase. Generally, the 2D material is present in the Pickering emulsion in an amount of at least about 0.001 wt. % based on the weight of the dispersed phase, such as from about 0.01 to about 20 wt. %, preferably from about 0.1 to about 15 wt. %, most preferably from about 0.2 to about 10 wt. %.

Alternatively, the 2D material is generally present in the Pickering emulsion in an amount of less than about 50 wt. %, more preferably less than about 40 wt. %, most preferably less than about 35 wt. %, based on the weight of the polysiloxane and the curing agent. Generally, the 2D material is present in the Pickering emulsion in an amount of at least about 0.2 wt. % based on the weight of the polysiloxane and the curing agent, such as from about 0.2 to about 50 wt. %, preferably from about 0.5 to about 40 wt. %, most preferably from about 1.0 to about 35 wt. %.

Typically, the 2D materials used in the invention form layers which are one atom or formula unit thick. These layers are typically about 1 to about 5 nm thick. The 2D material used in the present invention is therefore in the form of particles or flakes which generally have a thickness of from about 1 to about 50 nm, more preferably about 1 to about 10 nm, most preferably about 1 to about 5 nm. As used herein, the term "particles" includes flakes. The particles generally have an aspect ratio (length to thickness) of greater than about 50. Thus, the particles of 2D material may have a (number) average length of about 5 nm to about 5000 nm, preferably about 50 nm to about 2000 nm, more preferably from about 100 nm to about 1000 nm, more preferably from about 200 to about 500 nm, where the length is equivalent to the longest dimension of the flake or particle in the direction of the layer.

The particles may have an approximately round or square shape when viewed perpendicular to the 2D plane. Thus, the width of the particles may be approximately the same as the length. Alternatively, the particles of 2D material may have an approximately rectangular shape when viewed perpendicular to the 2D plane. Thus, the particles may have a (number) average width of about 2.5 nm to about 2500 nm, preferably about 20 nm to about 1000 nm, more preferably from about 50 nm to about 700 nm, more preferably from about 100 to about 300 nm, where the width is equivalent to the longest dimension of the particle which is perpendicular to the length and in the direction of the layer. The aspect ratio (length to width) of the particles is preferably less than about 3.

The 2D materials may therefore be considered to be "nanomaterials". The size (e.g. length and width) and thickness of the particles of 2D material can be measured using atomic force microscopy, transmission electron microscopy or dynamic light scattering techniques.

The particles must be small enough that they can effectively coat the droplets of the dispersed phase in the emulsion. The smaller the particles of the 2D material are, the smaller the droplets can be while still being coated by the particles.

Liquid Phases

In order to form a Pickering emulsion the skilled person would understand that one of the liquid phases must have a surface tension which is higher than the surface tension of the 2D material, and the other liquid phase must have a surface tension which is lower than the surface tension of the 2D material. The two liquid phases must also be immiscible.

FIG. 2 is a table indicating whether a range of liquid phases are immiscible or miscible with each other. In FIG. 2, "0" indicates combinations which are miscible, and "1" indicates combinations which are immiscible. Whether other combinations of liquids are miscible or immiscible can be readily determined by simple mixing experiments.

Conveniently, graphene and similar 2D materials are known to have surface tensions between that of water and many water-immiscible liquids. This avoids the need to surface modify or functionalise the 2D material to adjust the surface tension of the 2D material before a Pickering emulsion can be formed. Rather, a Pickering emulsion can naturally form using an unfunctionalised 2D material and two immiscible liquids such as water and a water-immiscible liquid. In contrast, clays and other silicates require surface modification to adjust the surface tension before a Pickering emulsion can be formed. Such modifications are well known to compromise the properties of 2D materials. It is therefore highly advantageous to be able to avoid surface modification of the 2D materials used in the invention.

The surface tensions of most liquids are well known in the art, (see, for example, *Thermophysical Properties of Chemicals and Hydrocarbons*, Carl L. Yaw, William Andrew, Norwich, NY, 2008). Alternatively, the surface tension of a liquid can be readily characterised experimentally using the Wilhelmy plate method (as described, for example, in "Understanding Solvent Spreading for Langmuir Deposition of Nanomaterial Films: A Hansen Solubility Parameter Approach", Large et. al., Langmuir, ACS, 2017, DOI: 10.1021/acs.langmuir.7b03867). Such a method can be carried out using a Nima PS4 surface pressure sensor at 25° C. The surface tensions of some common liquids are shown in Table 1 below. All surface tensions referred to herein are the surface tensions as measured at 25° C.

TABLE 1

| Liquid | Surface tension (mN/m) |
| --- | --- |
| Pentane | 15.5 |
| Hexane | 17.9 |
| Acetone | 23.0 |
| Ethyl acetate | 23.2 |
| Methyl methacrylate | 24.2 |
| Cyclohexane | 24.7 |
| Butyl acrylate | 25.6 |
| Chloroform | 26.7 |
| Acrylonitrile | 26.7 |
| Dichloromethane | 27.8 |
| Styrene | 32.0 |
| Cyclopentanone | 33.4 |
| Cyclohexanone | 34.4 |
| N-cyclohexyl-2-pyrrolidone | 38.8 |
| Propylene glycol | 45.6 |
| Ethylene glycol | 48.4 |
| Diethylene glycol | 55.1 |
| Formamide | 57.0 |
| Water | 72.7 |
| Glycerol | 76.2 |

Each liquid phase may comprise a single liquid having the required surface tension, or may comprise a mixture of liquids provided that the mixture has the required surface tension relative to the other liquid phase and the 2D material. For example, mixtures of liquids may be used to control the surface tension, or to tune properties (e.g. the viscosity) of the emulsion. A mixture of water and ethylene glycol, for example, will have a surface tension between that of pure water and pure ethylene glycol.

Whilst other components may optionally be present in either or both of the liquid phases, the 2D material acts as a stabiliser for the Pickering emulsion. As a result, unlike traditional emulsions, no surfactant stabiliser is required. Preferably therefore, no surfactants are present in the Pickering emulsions used in the present invention.

One of the liquid phases may be considered to represent a "water" phase, and should have a surface tension which is higher than that of the 2D material, such as from about 1 to about 35 mN/m higher, preferably from about 2 to about 10 mN/m higher, more preferably from about 3 to about 8 mN/m higher than the surface tension of the 2D material.

If the absolute values are considered, it is preferred that this liquid phase has a surface tension of at least about 43 mN/m, more preferably at least about 45 mN/m, and most preferably at least about 48 mN/m.

This liquid phase may form the continuous liquid phase (i.e. an oil-in-water emulsion), or may form the discontinuous liquid phase (i.e. a water-in-oil emulsion). As will be discussed further below, this liquid phase generally forms the continuous liquid phase when the surface tension of this phase is less than about 55 mN/m, preferably less than about 50 mN/m. In this case, it is therefore preferred that this liquid phase has a surface tension of from about 43 mN/m to about 55 mN/m, more preferably from about 45 mN/m to about 50 mN/m.

Conversely, this liquid phase generally forms the discontinuous liquid phase when the surface tension of this phase is more than about 55 mN/m, preferably more than about 65 mN/m, most preferably more than about 70 mN/m.

Preferably, this liquid phase comprises glycerol, water, formamide, diethylene glycol, ethylene glycol, propylene glycol or combinations thereof. More preferably, this liquid phase comprises water, propylene glycol, ethylene glycol, or combinations thereof.

When it is desired that this liquid phase forms the continuous phase, this liquid phase preferably comprises ethylene glycol. Alternatively, this liquid phase consists essentially of or consists of ethylene glycol. Ethylene glycol is a preferred liquid phase due to its immiscibility with a large number of organic solvents.

Alternatively, when it is desired that this liquid phase forms the discontinuous phase, this liquid phase preferably comprises water. Alternatively, this continuous liquid phase consists essentially of or consists of water.

The other liquid phase may be considered to represent an "oil" phase, and should have a surface tension which is lower than that of the 2D material, such as from about 5 to about 35 mN/m lower, preferably from about 10 to about 35 mN/m lower, more preferably from about 15 to about 25 mN/m lower than the surface tension of the 2D material.

If the absolute values are considered, it is preferred that this liquid phase has a surface tension of less than about 40 mN/m, more preferably less than about 35 mN/m, and most preferably less than about 30 mN/m.

This liquid phase comprises a polysiloxane and a curing agent, and may also comprise one or more organic solvents. Any organic solvent or solvents present in this phase should be miscible with the polysiloxane and the curing agent. Suitable organic solvents include, but are not limited to, hexane, acetone, tetrahydrofuran, chlorobenzene, diethyl ether, ethyl acetate, toluene, xylene, pentanol, butanol, propanol, ethanol, methanol, chloroform, acrylonitrile, dichloromethane, and combinations thereof. Preferably, the organic solvent is selected from ethyl acetate, dichloromethane and combinations thereof, more preferably a combination of ethyl acetate and dichloromethane.

The optional solvents may be used to adjust the viscosity of this liquid phase. For example, this liquid phase may have a viscosity of about 0.001 to about 10 Pa·s, preferably from about 0.01 to about 1 Pa·s, more preferably from about 0.1 to about 0.5 Pa·s, most preferably from about 0.2 to about 0.3 Pa·s. The presence of a solvent may also help to prevent premature curing of the polysiloxane.

This liquid phase may comprise from about 80 to about 95 wt. % polysiloxane and from about 20 to about 5 wt. % curing agent, based on the combined weight of the polysiloxane and curing agent. Preferably, this liquid phase comprises from about 87 to about 93 wt. % polysiloxane and from about 13 to about 7 wt. % curing agent, based on the combined weight of the polysiloxane and curing agent. The weight ratio of polysiloxane to curing agent may be from about 15:1 to about 5:1, preferably from about 12:1 to about 8:1, and most preferably about 10:1. The amount of curing agent should be sufficient to at least partially cure the polysiloxane. Preferably, the amount of curing agent is sufficient to fully cure the polysiloxane.

If a solvent is present, it may be present in any amount suitable to dissolve the polysiloxane and curing agent, and/or reduce the viscosity and/or density of the liquid phase to the desired level. Matching the viscosity of the two liquid phases helps to maximise the local shear rates during mixing, thereby facilitating a smaller average droplet size for the same energy input. The amount of solvent present will depend at least in part on the viscosity of the solvent, as well as the nature and viscosity of the polysiloxane. Preferably, this liquid phase comprises from about 10 to about 90 wt. % solvent, more preferably from about 40 to about 85 wt. % solvent, and most preferably from about 60 to about 80 wt. % solvent.

Orientation of the Phases

Depending on the surface tension of the "water" phase, the "oil" phase will either form the discontinuous phase (where the "water" phase forms the continuous phase), or will form the continuous phase (where the "water" phase forms the discontinuous phase). Thus, the orientation of the liquid phases is dependent mainly on the nature (and therefore the surface tension) of the "water" phase.

As discussed above, the orientation of the liquid phases is dependent mainly on the nature of the "water" phase. Thus, when it is desirable for the polysiloxane to be in the discontinuous phase, the liquid phase which does not contain the polysiloxane (i.e. the "water" phase) should have a surface tension of less than about 55 mN/m, preferably less than about 50 mN/m. Suitable liquid phases include, but are not limited to, ethylene glycol, propylene glycol and combinations thereof, preferably ethylene glycol.

Conversely, when it is desirable for the polysiloxane to be in the continuous phase, the liquid phase which does not contain the polysiloxane (i.e. the "water" phase) should have a surface tension of more than about 55 mN/m, preferably more than about 65 mN/m, most preferably more than about 70 mN/m. Suitable liquid phases include, but are not limited to, glycerol, water, formamide, diethylene glycol, and combinations thereof, preferably water.

To form the polysiloxane elastomer balls and some of the composite materials described herein, it is necessary for the polysiloxane to be the discontinuous phase.

If necessary, the orientation of any two phases can be determined by mixing the phases together and observing the type of emulsion which forms. Alternatively, the orientation of the phases in the Pickering emulsion can be predicted based on the surface energies of the phases. In particular, it is possible to derive equation (1) below, which shows the point at which phase inversion will occur:

$$\frac{(\sqrt{\gamma_o} + \sqrt{\gamma_w})^2}{4} = \gamma_s \qquad \text{Equation (1)}$$

where $\gamma_o$, $\gamma_w$ and $\gamma_s$ are the surface energies of the oil phase, water phase and solid respectively.

For liquids, the surface energy ($\gamma$) is equal to the sum of the surface tension ($\Gamma$) and the surface entropy, where the surface entropy can be approximated as 29 mJ/m$^2$ for liquids at room temperature. The surface tension can be determined experimentally, for example using the Wilhelmy plate method as discussed above.

For the 2D material, the value of $\gamma_s$ can be determined experimentally. This can be done by experimentally determining values of $\gamma_o$ and $\gamma_w$ where the emulsion changes from an oil-in-water emulsion to a water-in-oil emulsion, or vice versa, and substituting said values into equation (1).

For example, ethyl acetate may be used as the "oil" phase (surface tension ($\Gamma$)=23.3 mN/m) such that $\gamma_o$ is constant (i.e. 23.3+29=52.3 mN/m). Different volume ratios of ethylene glycol and deionised water may then be used to change the value of $\gamma_w$. Since ethyl acetate is less dense than water and ethylene glycol, oil-in-water droplets will float, while water-in-oil droplets will sink. The transition between an oil-in-water and water-in-oil emulsion can therefore be seen visually. When graphene is the 2D material, this inversion occurs when the surface tension ($\Gamma$) of the "water" phase is 52 mN/m. $\gamma_w$ is therefore 52+29=81 mN/m.

Substituting $\gamma_o$=52.3 mN/m and $\gamma_w$=81 mN/m into equation (1) gives the result $\gamma_s$=66 mN/m for graphene. The $\gamma_s$ value for other 2D materials can be determined in a similar way.

Figure 3:
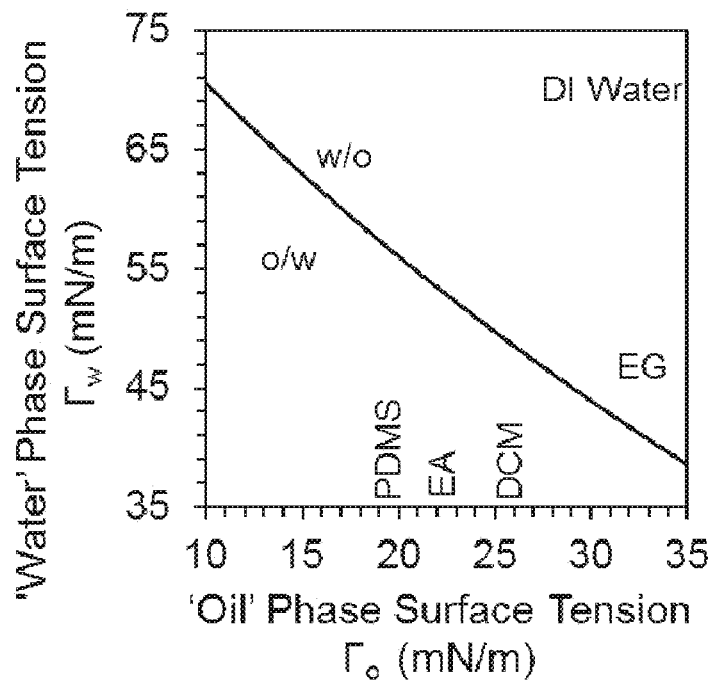
FIG. 3 shows the expected orientation of an emulsion as a function of the surface tension of the "water" and "oil" phases.

FIG. 3 shows a plot of equation (1) where $\gamma_s$=66 mN/m (i.e. for a system containing graphene as the 2D material). The surface tensions of PDMS, ethyl acetate (EA), dichloromethane (DCM), ethylene glycol (EG) and deionised water are also shown in FIG. 3.

By plotting the surface tension of the "oil" and "water" phases, FIG. 3 may be used to determine the expected orientation of any given Pickering emulsion where the 2D material is graphene. For example, when the two liquid phases are PDMS and ethylene glycol and the 2D material is graphene, an oil-in-water emulsion will form, as the intersection between the "PDMS" and "EG" lines falls below the solid line and in the "o/w" region. Conversely, when the two liquid phases are PDMS and water and the 2D material is graphene, a water-in-oil emulsion will form, as the intersection between the "PDMS" and "water" lines falls above the solid line and in the "w/o" region.

Polysiloxane

Polysiloxanes may also be referred to as silicones.

Polysiloxanes or silicones are polymers which are made up of repeating units of siloxane, which is a chain of alternating silicon atoms and oxygen atoms, combined with carbon, hydrogen, and sometimes other elements. Thus, polysiloxanes contain an inorganic silicon-oxygen backbone chain ( . . . —Si—O—Si—O—Si—O— . . . ) with organic side groups attached to the silicon atoms such that each silicon atom is tetravalent. Silicones can therefore be represented by the general chemical formula [R$_2$SiO]$_n$, where R is an organic group and n is an integer greater than 1.

By varying the —Si—O— chain lengths and the nature of the organic side groups, silicones can be synthesized with a wide variety of properties and compositions.

Polysiloxane or silicone elastomers can be formed by cross-linking individual polymer chains to form a 3D network. The process of crosslinking polysiloxanes to form polysiloxane elastomers is also known as curing.

The nature of the polysiloxane used in the present invention is not critical, and as such any polysiloxane which may be cured to form a polysiloxane elastomer may be used herein. Any curing mechanism known in the art may be used for forming the polysiloxane elastomer.

Suitable polysiloxanes for use in the present invention, and curing mechanisms for forming polysiloxane elastomers, are well known in the art, for example from 'Chemistry and Technology of Silicones', W. Noll, Academic Press, New York (1968); 'Synthesis and Properties of Silicone and Silicone-Modified Materials', Clarson et al., 2003; and 'Inorganic Polymers', 2nd edition, Mark et al., 2005. Suitable polysiloxanes for use in the invention are commercially available from, for example, Dow Inc. or Wacker, Inc.

The polysiloxanes used herein may comprise a single polysiloxane or a blend of two or more polysiloxanes.

Suitable polysiloxanes for use in the present invention include, but are not limited to, those having the structure of Formula (I):

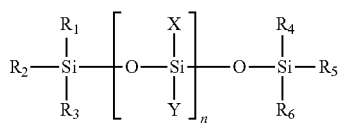

Formula (I)

wherein:
each of $R_1$, $R_2$, $R_3$, $R_4$, $R_5$ and $R_6$ is independently H or an organic group;
X is an organic group;
Y is H or an organic group; and
and n is any integer greater than 1.

Other suitable polysiloxanes include, but are not limited to, those having the structure of Formula (II):

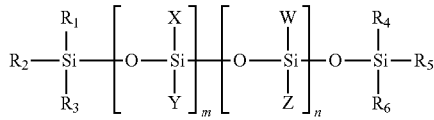

Formula (II)

wherein:
each of $R_1$, $R_2$, $R_3$, $R_4$, $R_5$ and $R_6$ is independently H or an organic group;
X is an organic group;
Y is H or an organic group;
W is an organic group;
Z is H or an organic group; and
and n and m are each any integer greater than 1.
Preferably, n is from 100 to 100,000.
Preferably, m is from 100 to 100,000.

The organic groups may optionally contain one or more the following functional groups: alkene, alcohol, aldehyde, ketone, carboxylic acid, aryl, ether, ester, amine, imine, or amide.

For example, suitable organic groups include alkyl groups (such as methyl, ethyl, propyl or butyl), —OH, alkoxy groups, esters (such as acetoxy groups), alkenyl groups (such as —$(CH_2)_n$—CH=$CH_2$, where n is any integer, for example 0, 1, 2 or 3), and aryl groups (such as phenyl).

Preferred organic groups containing include methyl, —OH, —$(CH_2)_n$—CH=$CH_2$, where n is 0 or 1, acetoxy, and phenyl. More preferred organic groups include methyl and —OH.

Thus, preferably each of $R_1$, $R_2$, $R_3$, $R_4$, $R_5$ and $R_6$ is independently H, methyl, —CH=$CH_2$, acetoxy or —OH. More preferably, each of $R_1$, $R_3$, $R_4$, and $R_6$ is methyl, and $R_2$ and $R_5$ are each independently H, methyl, —CH=$CH_2$, or —OH.

Preferably, X is methyl, —OH, acetoxy, —$(CH_2)_n$—CH=$CH_2$, where n is 0 or 1, or phenyl.

More preferably, X is methyl or —CH=$CH_2$, most preferably methyl.

Preferably, Y is H, methyl, —OH, acetoxy, —$(CH_2)_n$—CH=$CH_2$, where n is 0 or 1, or phenyl. More preferably, Y is H, methyl or —CH=$CH_2$, most preferably methyl.

Preferably, W is methyl, —OH, acetoxy, —$(CH_2)_n$—CH=$CH_2$, where n is 0 or 1, or phenyl.

More preferably, W is methyl or —CH=$CH_2$, most preferably methyl.

Preferably, Z is H, methyl, —OH, acetoxy, —$(CH_2)_n$—CH=$CH_2$, where n is 0 or 1, or phenyl. More preferably, Z is H, methyl or —CH=$CH_2$, most preferably methyl.

Thus, preferably the polysiloxane is a compound of Formula (I), wherein:
$R_1$, $R_3$, $R_4$, and $R_6$ are methyl;
$R_2$ and $R_5$ are each independently H, methyl, —CH=$CH_2$, acetoxy or —OH;
X is methyl; and
Y is H or methyl.

Alternatively, preferably the polysiloxane is a compound of Formula (II), wherein:
$R_1$, $R_3$, $R_4$, and $R_6$ are methyl;
$R_2$ and $R_5$ are each independently H, methyl, —CH=$CH_2$, acetoxy or —OH;
X, W and Z are methyl; and
Y is H or methyl.

The polysiloxane may be polydimethylsiloxane (PDMS), which may be, for example, unfunctionalised PDMS, hydroxy-terminated PDMS or vinyl-terminated PDMS.

The polysiloxane used herein may contain an alkenyl group (e.g. a vinyl group). Thus, the polysiloxane may be a polymer of Formula (I) or (II), wherein at least one of the $R_1$ to $R_6$, X, Y, W and Z groups contains an alkenyl group, preferably a vinyl group.

Such polysiloxanes include alkenyl-terminated polysiloxanes, preferably vinyl-terminated polysiloxanes (i.e. wherein at least one of the $R_1$ to $R_6$ groups contains a alkenyl group, preferably a vinyl group), such as alkenyl terminated polydimethylsiloxane (alkenyl terminated PDMS), preferably vinyl terminated polydimethylsiloxane (vinyl terminated PDMS).

Alternatively, the polysiloxane used herein may comprise a polysiloxane containing a hydrolysable group (e.g. an ester or amide group, preferably an ester). Thus, the polysiloxane may be a polymer of Formula (I) or (II), wherein at least one of the $R_1$ to $R_6$, X, Y, W and Z groups contains an ester or amide group, preferably an ester group. Preferred ester groups include acetoxy (—OAc).

Alternatively, the polysiloxane used herein may comprise a polysiloxane containing an alcohol group. Thus, the polysiloxane may be a polymer of Formula (I) or (II), wherein at least one of the $R_1$ to $R_6$, X, Y, W and Z groups contains or is, preferably is, —OH.

The polysiloxane used in the present invention may have any viscosity, although it should preferably be liquid at room temperature and pressure (25° C. and 1 atm). Alternatively, the polysiloxane may be solid at room temperature but soluble in a solvent. If the polysiloxane is a liquid but the viscosity is too high, it will be necessary to include a solvent in the liquid phase of the Pickering emulsion containing the polysiloxane, in order to reduce the viscosity of the liquid phase. The polysiloxane used herein therefore preferably has a viscosity of from about 0.01 to about 10 Pa·s, more preferably from about 0.1 to about 1 Pa·s, and even more preferably from about 0.5 to about 1 Pa·s. Polysiloxanes of a range of different viscosities are commercially available.

Curing Agent

A curing or crosslinking agent is required in order to cure or crosslink the polysiloxane to form a polysiloxane elastomer. Any suitable curing or crosslinking agent may be used, and the skilled person would be aware of curing agents useful in forming polysiloxane elastomers. For example, suitable curing systems and curing agents are known from 'Silicone resins and their combinations', European Coatings Literature, Heilen, 2005; and 'Biomaterials Science—An Introduction to Materials in Medicine', 2nd edition, Elsevier Academic Press, Ratner et al., 2004.

Two-component products comprising a polysiloxane and a suitable curing agent are commercially available, for example QSIL 216 from Farnell UK.

There are various different types of curing systems, including: (1) hydrosilylation based systems; (2) condensation cure systems; and (3) radical cure systems.

(1) Hydrosilylation System

In a hydrosilylation silicone cure system, two different chemical groups (a compound containing an Si—H group and a polysiloxane containing an alkenyl group, preferably a vinyl group) react in the presence of a catalyst (often a platinum catalyst). This type of reaction system is well known in the art, for example in U.S. Pat. No. 3,989,668 and US 2011/178224.

The reaction is shown schematically below:

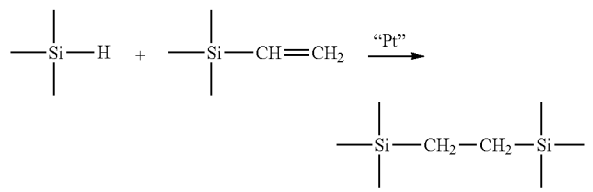

Thus, in this system the polysiloxane is a polysiloxane containing one or more alkenyl groups (e.g. a vinyl group). Suitable polysiloxanes containing one or more alkenyl groups are discussed above.

In this system, the curing agent comprises (i) a compound containing one or more Si—H groups; and (ii) a hydrosilylation catalyst.

The compound containing an Si—H group may be any such compound. For example, suitable compounds include tetrakis(dimethylsiloxy)silane or poly(methylhydrosiloxane).

The nature of the hydrosilylation catalyst is not particularly restricted, and can be any conventional hydrosilylation catalyst, for example a platinum-based hydrosilylation catalyst. Suitable catalysts are known in the art, for example in US 2011/0178224 and U.S. Pat. No. 3,989,668.

Specific examples of suitable catalysts include, but are not limited to, elementary platinum, platinum-vinylsiloxane complexes (e.g. Karstedt's catalyst); platinum-phosphine complexes (e.g. $Pt(PPh_3)_4$); platinum-phosphite complexes (e.g. $Pt[P(OPh)_3]_4$); $RhCl_3$; $PdCl_2 \cdot 2H_2O$; $TiCl_4$; and Pt(acac)$_2$. The catalysts may be used alone or in combination.

(2) Condensation Cure System

A condensation curing system uses water (e.g. moisture in the atmosphere) to trigger a curing process. Such processes may take place at room temperature and pressure (i.e. 25° C. and 1 atm). This type of system is also well-known in the art, for example from U.S. Pat. No. 4,562,238.

In this process, a silane crosslinker exposed to water (e.g. ambient humidity) undergoes a hydrolysis step which produces a silanol (Si—OH) group. The silanol group condenses with a hydrolysable group on the polysiloxane until the system is fully cured.

Thus, in this system the polysiloxane generally contains a hydrolysable group, such as an ester or amide group (preferably an ester, such as —OAc). Alternatively or in addition, the polysiloxane may already contain an Si—OH group, and may therefore be a hydroxy-terminated polysiloxane.

In this system the curing agent therefore comprises a silane crosslinker. Any suitable silane crosslinker may be used. For example, the curing agent may be a silane containing an alkoxy, acetoxy, ester, enoxy or oxime group, preferably an alkoxy group. Acetoxy silanes are a preferred class of curing agents. Examples of suitable curing agents include methyl trimethoxy silane or methyl triacetoxysilane.

In addition, a condensation catalyst (such as a tin-based catalyst) may also be included in the curing agent. Suitable catalysts are well-known in the art, for example in U.S. Pat. No. 3,989,668, and include dibutyltin dilaurate.

(3) Radical Cure System

Free radicals, that is atoms, molecules or ions having an unpaired valence electron, may also be used to cure a polysiloxane and form a polysiloxane elastomer.

Radicals generally form when a radical initiator decomposes to form radicals which react with the side groups of a polysiloxane chain to generate radicals. These in turn react with radicals formed from other polysiloxane chains, thereby chemically crosslinking the polysiloxane chains. The mechanism is shown below for an organic peroxide initiator (R denotes an organic group):

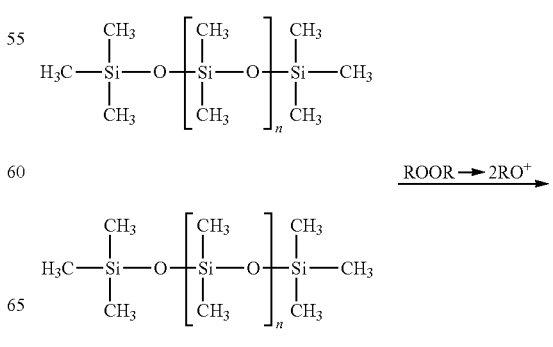

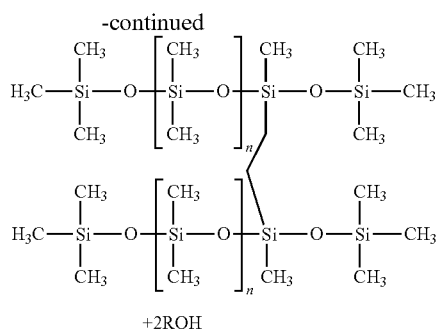

+2ROH

Radicals can be formed using any suitable radical initiator, such as peroxides, azo compounds and halogens. The conditions needed for form a radical from a radical initiator are known in the art, and often include heating or ultraviolet light.

In this system the polysiloxane may be any polysiloxane suitable containing a C—H bond. For example, PDMS may be used.

In this system the curing agent is a radial initiator, such as a peroxide, an azo compound or a halogen. Any suitable radial initiators can be used, and examples of suitable radial initiators are known in the art.

Peroxides are preferred radial initiators, with organic peroxides being particularly preferred. For example, the organic peroxide may be selected from diacyl peroxide, dicumyl peroxide, di-tert-butyl peroxide or dichlorobenzoyl peroxide.

Emulsions

The (number) average (mean) diameter of the droplets within the Pickering emulsion which is formed is preferably about 10,000 µm or less, more preferably about 1000 µm or less, and most preferably about 100 µm or less. Generally, the droplets have a (number) average diameter of at least about 100 nm, more preferably at least about 200 nm and most preferably at least about 1 µm. For droplets above about 10 µm, optical microscopy can be used to measure the average diameters. Below this size, dynamic light scattering (DLS) can be used to measure the average diameters.

The Pickering emulsions described herein generally comprises at least about 85 vol. % liquid, preferably at least about 90 vol. % liquid, more preferably at least about 95 vol. % liquid, where the liquid includes both the continuous and dispersed liquid phases.

Preferably, the Pickering emulsion comprises from about 50 to about 75 vol. % of the continuous liquid phase, based on the total volume of the liquid phases, and from about 25 to about 50 vol. % of the dispersed liquid phase, based on the total volume of the liquid phases.

Preferably, the liquid phase which forms the continuous phase and the liquid phase which forms the dispersed phase are present in a volume ratio of from about 3:1 to about 1:1 (continuous liquid phase to dispersed liquid phase), most preferably from about 2:1 to about 1:1, most preferably about 3:2.

Process of Making a Pickering Emulsion

In order to form the materials of the present invention it is necessary to form a Pickering emulsion. Processes for making Pickering emulsions (i.e. step (1) of the methods of the invention) are known in the art. One suitable method may comprise:

(1a) exfoliating a layered 3D material in a solvent to produce particles of a 2D material;

(1b) forming a dispersion of the particles of the 2D material in a first liquid phase; and (1c) adding a second liquid phase and homogenising the dispersion of the 2D material in the first liquid phase with the second liquid phase thereby forming a Pickering emulsion comprising a continuous liquid phase, a discontinuous liquid phase, and the 2D material.

As discussed above, in order to form a Pickering emulsion one of the liquid phases should have a surface tension which is higher than the surface tension of the 2D material, and the other liquid phase should have a surface tension which is lower than the surface tension of the 2D material. In addition, the first and second liquid phases should be immiscible.

The first and second liquid phases, and the 2D material, used in the above method may comprise the liquids and materials discussed above. The polysiloxane and curing agent may be present in the first liquid phase or the second liquid phase. Preferably, the polysiloxane and curing agent are present in the first liquid phase, which preferably forms the discontinuous phase.

Step (1a)

Suitable methods for exfoliating layered 3D materials in a solvent to form particles of 2D materials are known in the art. For example, methods for exfoliating a layered 3D material to produce particles of a 2D material may comprise applying energy, e.g. ultrasound, to a layered 3D material in a solvent. Alternatively, shear force can be applied to a layered 3D material in a solvent. Suitable methods are disclosed in WO 2012/028724, WO 2014/001519 and US 2016/0009561.

Step (1b)

In some embodiments, the solvent used in step (1a) corresponds to the first liquid phase, and therefore step (1b) is simply the result of carrying out step (1a). In this case the solvent must be immiscible with the second liquid phase. However, in order to allow for better exfoliation of the 2D material, it is preferred that the solvent used in step (1a) is different to the first liquid phase.

When the solvent used in step (1a) is different to the first liquid phase, step (1 b) may further comprise removing at least some of the solvent before adding a first liquid phase to form the dispersion of the 2D material in a first liquid phase. Thus, in this case step (1b) comprises:

(1b1) removing at least some of the solvent and then adding a first liquid phase thereby forming a dispersion of the particles of the 2D material in the first liquid phase.

Preferably, the majority of the solvent (at least about 50 wt. %) is removed in step (1b1). More preferably, at least about 80 wt. %, and most preferably at least about 95 wt. % (such as about 100 wt. %) of the solvent is removed. Alternatively, all of the solvent may be removed.

Alternatively, the first liquid phase may comprise the solvent and one or more further components, such as a polysiloxane and a curing agent. In this case step (1b) comprises:

(1b2) adding one or more components, thereby forming a dispersion of the particles of the 2D material in a first liquid phase.

In this case, the first liquid phase will comprise the solvent used in step (1a) and the one or more components added in step (1b2). Thus, the first liquid phase preferably comprises the solvent used in step (1a), a polysiloxane and a curing agent.

If desired, the solvent may be removed by any suitable process. For example the dispersion may be centrifuged (e.g.

at 5000 g for 24 hours) to sediment the 2D material, after which the supernatant (i.e. the solvent) can be discarded and the 2D material transferred into the first liquid phase. Alternatively, vacuum filtration can be used to prepare a "wet cake" of the exfoliated material which can be re-dispersed in the first liquid phase.

In the case where the solvent used in step (1a) is different to the first liquid phase, it is preferred that the solvent used in step (1a) is miscible with the first liquid phase in order to prevent formation of any unwanted emulsion during transfer of the particles to the first liquid phase. More preferably, the solvent is miscible with both the first liquid phase and the second liquid phase, in order to minimise any deviations in relative surface tensions of the two phases due to the presence of any residual solvent.

The solvent used in step (1a) will depend in part on the material being exfoliated. As discussed above, methods for exfoliating 3D materials to form 2D materials are known in the art, for example from WO 2012/028724, WO 2014/001519, US 2016/0009561 and Hernandez et al., Langmuir, 2010, 26 (5), 3208-3213. The skilled person would therefore be able to select a suitable solvent for the 2D material being exfoliated.

For example, the solvent may be selected from N-methyl-2-pyrrolidone (NMP), N-cyclohexyl-2-pyrrolidone (CHP), 1,3-dimethyl-2-imidazolidinone (DMEU), N-ethyl-2-pyrrolidone (NEP), isopropanol, acetone, cyclopentanone (CPO) and cyclohexanone (CHO).

Preferably, the solvent used in step (1a) has a surface tension of about 30 to about 50 mN/m. More preferably, the solvent used in step (1a) has a surface tension which is approximately the same as that of the 2D material. Therefore, the solvent used in step (1a) preferably has a surface tension of about 40 to about 50 mN/m, more preferably about 40 to about 45 mN/m.

Thus, preferably the solvent is selected from N-methyl-2-pyrrolidone (NMP), N-cyclohexyl-2-pyrrolidone (CHP), cyclopentanone (CPO) and cyclohexanone (CHO), more preferably cyclopentanone (CPO) and cyclohexanone (CHO). Cyclopentanone is particular preferred, especially for the exfoliation of graphite to form graphene.

If the solvent used in step (1a) is equivalent to the first liquid phase, or if the solvent used in step (1a) is contained within the first liquid phase (i.e. wherein step 1(b) comprises step (1b2)), it is preferred that the solvent is selected from cyclopentanone, cyclohexanone, and combinations thereof. In this case, the second liquid phase preferably comprises ethylene glycol.

Alternatively, the solvent used in step (1a) may comprise a mixture of water and a surfactant. Any suitable surfactant may be used, such as an ionic or a non-ionic surfactant. The surfactant is ideally water-soluble. Triton™ X-100 (polyethylene glycol tert-octylphenyl ether) is one example of a suitable non-ionic surfactant, and sodium cholate is one example of a suitable ionic surfactant.

The surfactant may be present in the solvent used in step (1a) in the amount of from about 0.01 to about 0.05 wt. %, preferably from about 0.02 to about 0.03 wt %, based on the weight of water.

If the solvent in step (1a) comprises water and a surfactant, it is necessary to remove at least part of the surfactant before forming the Pickering emulsion. As such, step (1b) comprises step (1b1), as described above. In this case, step (1b1) comprises removing at least some of the mixture of water and surfactant, and then adding a first liquid phase, such as water (without any surfactant).

Step (1c)

Step (1c) comprises adding a second liquid to the dispersion of the 2D material in the first liquid phase, and then homogenising the two liquid phases and the 2D material to form a Pickering emulsion.

The homogenising step may simply comprise applying mechanical agitation to the mixture, such as by mixing or shaking the two liquid phases and the 2D material. Preferably, the mixture is homogenized by applying high shear forces, ultrasonic mixing, or by the use of a microfluidizer. A microfluidizer is preferred, as this allows for control of the droplet sizes and droplet size distribution in the resulting Pickering emulsion.

The viscosity of the resulting Pickering emulsion will depend on the droplet diameter, the volume percentage of the dispersed phase, and/or the viscosity of the continuous phase.

Figure 4:
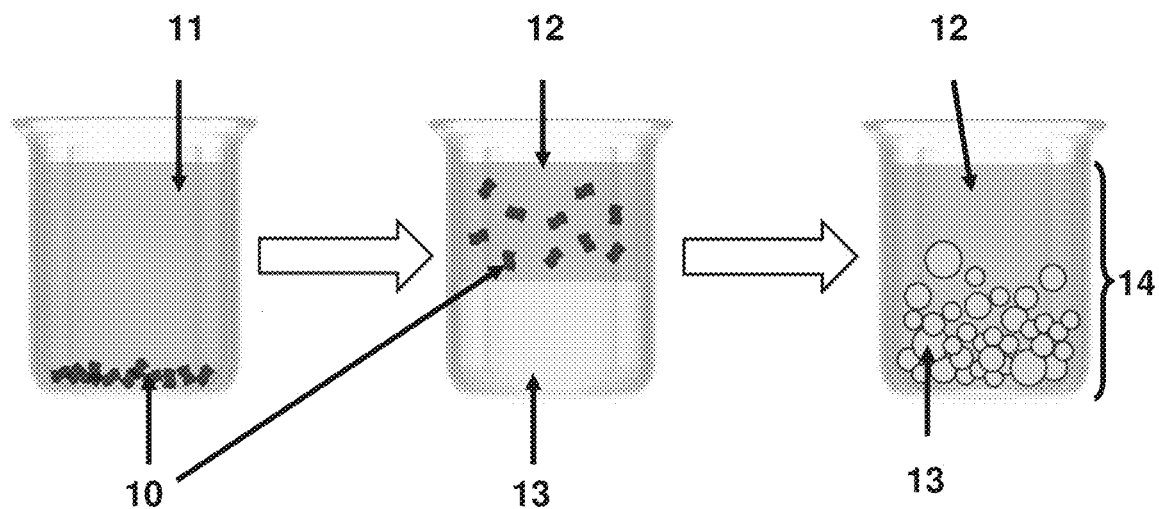
FIG. 4 is a schematic of a process for forming a Pickering emulsion.

The process discussed above is shown in schematic form in FIG. 4. FIG. 4 shows a process wherein a 2D material (10) is formed by exfoliating a layered 3D material in a solvent (11), after which the 2D material (10) is transferred (e.g. by a centrifugation process) to a first liquid phase (12), and a second liquid phase (13) is added. The liquid phases (12, 13) are then mixed and the emulsion is homogenised (e.g. through a high-shear mixing process such as ultrasonication or microfluidisation) to form a Pickering emulsion (14).

Alternatively, suitable 2D materials such as graphene are commercially available. When commercially available 2D materials are used, step (1a) is not necessary, and the method of forming a Pickering emulsion may simply comprise: dispersing particles of a 2D material in a first liquid phase, adding a second liquid phase and homogenising the dispersion. Alternatively, the first liquid phase, the second liquid phase and the particles of 2D material could simply be mixed and homogenised.

Materials

As used herein, the term "composite material" means a solid material made from two or more constituent materials which remain separate and distinct within the finished structure.

Having made a Pickering emulsion (i.e. step (1) of the methods of the invention), the materials of the present invention can then be formed. Depending on the nature of the Pickering emulsion, in particular which liquid phase forms the continuous phase within the Pickering emulsion, different materials may be formed. In addition, depending on the conditions under which the polysiloxane is allowed to cure, different materials may be formed from the same Pickering emulsions.

In particular, as will be explained further below, when a Pickering emulsion where the polysiloxane is part of the discontinuous phase is left in a sealed environment, such that the continuous liquid phase cannot easily evaporate, a composite material comprising a matrix phase of polysiloxane elastomer and a network of dispersed 2D material will form.

Without wishing to be bound by theory, it is believed that in this method the polysiloxane polymer chains in the discontinuous phase of the Pickering emulsion are able to diffuse across the 2D material coating and through the continuous phase of the Pickering emulsion. A curing (or crosslinking) process then takes place. As a result, polysiloxane polymers that have diffused out of one droplet form "bridges" with polysiloxane polymers from nearby droplets. Over time, these bridges grow in number and size until the previously segregated polymers form a new matrix phase of polysiloxane elastomer. This matrix phase contains a well-defined and highly ordered network of the 2D material, which results from the 2D material that was coating the droplets in the Pickering emulsion.

The physical properties of the resulting composite will depend at least in part on the length of time the emulsion rests in a sealed environment. For example, longer resting times will allow for greater diffusion of polysiloxane across the 2D material into the continuous phase and cross-linking with polysiloxane chains from other droplets.

In contrast, where the same Pickering emulsion is left in an unsealed environment the continuous liquid phase can at least partially evaporate whilst the polysiloxane cures. This will result in the formation of 'balls' of polysiloxane elastomer coated with a 2D material. The polysiloxane 'balls' can then be separated from any liquid phase remaining after the polysiloxane has cured, for example by using a sieve. Without wishing to be bound by theory, it is believed in this method the continuous liquid phase at least partially evaporates and the polysiloxane cures within the droplets formed in the Pickering emulsion before the polysiloxane can diffuse through the 2D material.

Alternatively, where a Pickering emulsion containing the polysiloxane in the continuous phase is formed and the polysiloxane allowed to cure, a composite material will form comprising a continuous matrix phase of polysiloxane elastomer and a network of voids with the 2D material coating the surface of the polysiloxane surrounding the voids. This material is similar in structure to a sponge or other porous solid material.

The voids in this material can form by evaporation of the discontinuous liquid phase. Alternatively, if any liquid phase is trapped in the polysiloxane elastomer, this can be removed by disrupting (e.g. by compressing) the elastomeric material, thereby creating a pathway for the discontinuous liquid phase to escape from the matrix.

Thus, in one aspect the method of the invention comprises:
(1) forming a Pickering emulsion comprising a continuous liquid phase, a discontinuous liquid phase, and a 2D material; wherein the discontinuous liquid phase comprises a polysiloxane and a curing agent;
(2) leaving the Pickering emulsion formed in step (1) in a sealed system for sufficient time to at least partially cure the polysiloxane; and
(3) allowing any remaining liquid to evaporate.

This method is illustrated in Examples 3 and 6.

The invention also provides a composite material formed by the above method.

As discussed above, in this process it is believed that during step (2) of the above method the polysiloxane polymer chains in the discontinuous phase of the Pickering emulsion are able to diffuse across the 2D material coating and through the continuous phase of the Pickering emulsion. A curing (or crosslinking) process then takes place.

Step (2) may comprise leaving the Pickering emulsion in a sealed system for sufficient time to fully cure the polysiloxane. Alternatively, step (2) may comprise leaving the Pickering emulsion in a sealed system for sufficient time to partially cure the polysiloxane, after which the material is removed from the sealed environment. Curing can then be completed by heating the composite material, for example in an oven.

Step (2) may comprise leaving the Pickering emulsion in a sealed system or environment for at least 24 hours, preferably for at least about 48 hours, more preferably at least 7 days. The exact time may depend on the amount of 2D material in the Pickering emulsion, with longer times generally needed when more 2D material is present. The Pickering emulsion may be left at room temperature and pressure (25° C. and 1 atm). Alternatively, the Pickering emulsion may be left at an elevated temperature, such as from about 40° C. to about 50° C., and optionally at an elevated pressure. In this case, the curing time may be reduced.

Step (3) of the above method comprises allowing any remaining liquid to evaporate. The liquid will include the liquid from the original continuous phase and any solvent from the original discontinuous phase. This step may comprise leaving the product of step (2) in a unsealed system for sufficient time for the liquid to evaporate. For example, this step may comprise leaving the product of step (2) in an unsealed system for at least about 1 hour, preferably at least about 6 hours.

The evaporation may occur at room temperature and pressure (25° C. and 1 atm). Alternatively, step (3) may comprise leaving the product of step (2) in a unsealed system at an elevated temperature, such as from about 30° C. to about 70° C.

After evaporation of any remaining liquid (i.e. step (3)), a composite material, such as a composite film, is formed containing a matrix phase of polysiloxane elastomer and a highly ordered network of the 2D material.

The form of the composite material will depend on the system in which the curing takes place. For example, a composite film may be formed when the Pickering emulsion is allowed to cure in a thin layer. Alternatively, the Pickering emulsion may be left in a mold to form a molded composite product. The total volume of the composite material formed will be less than the volume of the Pickering emulsion, due to evaporation of any remaining liquid in step (3).

Figure 5:
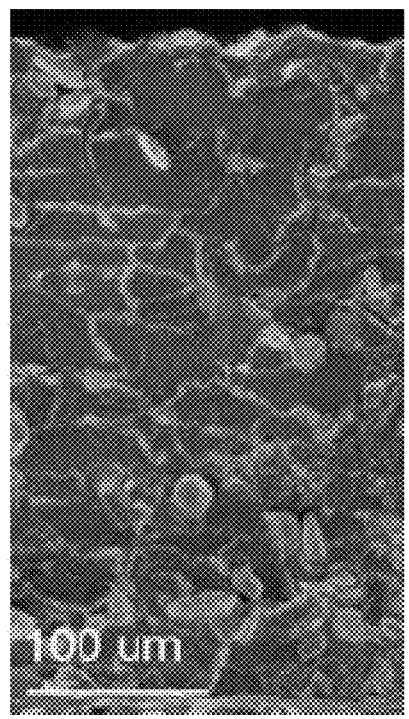
FIG. 5 is an SEM image of a composite material of the invention.

For example, where the Pickering emulsion comprises graphene-coated PDMS, a cured PDMS elastomeric composite film containing a discrete graphene network may be formed by this method. An SEM image of such a film is shown in FIG. 5, where the lighter lines are a graphene network within the PDMS matrix.

Also disclosed herein is a process which comprises allowing the polysiloxane to cure whilst in an unsealed system where the continuous liquid phase and any solvent from the discontinuous phase can evaporate. In this method, the continuous liquid phase evaporates and the polysiloxane cures before the polysiloxane chains can diffuse through the 2D material. As such, as discussed above, this method results in the formation of 'balls' of polysiloxane elastomer coated with a 2D material.

As used herein, the term 'balls' means spherical or nearly spherical particles. These balls are preferably spherical.

Disclosed herein is therefore a method of making polysiloxane elastomer balls coated with a 2D material comprising:
(1) forming a Pickering emulsion comprising a continuous liquid phase, a discontinuous liquid phase, and a 2D material; wherein the discontinuous liquid phase comprises a polysiloxane and a curing agent; and
(2) allowing the continuous liquid phase to at least partially evaporate and the polysiloxane to at least partially cure.

This method is illustrated by Reference Example 2.

Step (1) may comprise the process disclosed above for forming a Pickering emulsion.

For Pickering emulsions wherein the "water" phases forms the discontinuous phase (i.e. a water-in-oil emulsion) a hydrophobic container (e.g. silanized glass) is preferably used to prevent the droplets from bursting, as the high surface tension water phase will seek to stabilise the even greater surface energy disparity between glass and the 2D material.

Preferably, step (2) comprises allowing the continuous liquid phase to evaporate and the polysiloxane to at least partially cure.

Preferably, step (2) comprises allowing the continuous liquid phase to evaporate and the polysiloxane to fully cure.

Alternatively, step (2) may comprise allowing the continuous liquid phase to partially evaporate and the polysiloxane to cure, after which the elastomer balls may be separated from the remaining liquid phase (e.g. with a sieve).

Step (2) may be carried out by leaving the Pickering emulsion formed in step (1) in an unsealed environment for a period of time, optionally at an elevated temperature.

For example, step (2) may comprise leaving the Pickering emulsion formed in step (1) in an unsealed environment for a period of from about 2 hours to about 24 hours at room temperature and pressure (25° C., 1 atm). Increasing the temperature will speed up curing of the polysiloxane and/or speed up evaporation of the continuous liquid phase, and will therefore reduce the time taken to carry out step (2). Thus, step (2) may comprise exposing the Pickering emulsion formed in step (1) to an unsealed environment for a period of from about 10 minutes to about 2 hours at from about 60° C. to about 120° C.

During this evaporation process, the polysiloxane polymer within the droplets undergoes a curing or crosslinking process to form a polysiloxane elastomer. Thus, after the continuous liquid phase has evaporated and curing has taken place, a plurality of discrete polysiloxane elastomer balls coated with the 2D material are formed.

Figure 6:
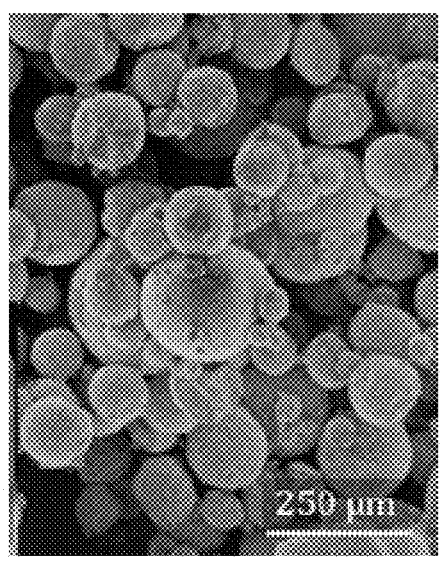
FIG. 6 is an SEM image of the elastomer balls described herein.

Thus, when the Pickering emulsion comprises graphene-coated PDMS, graphene-coated cured PDMS elastomeric balls are formed by this method. An SEM image of such graphene-coated silicone particles is shown in FIG. 6.

The plurality of discrete balls closely resembles dry sand in texture.

The coated balls formed according to the method discussed above are generally smaller in size than the droplets contained within the Pickering emulsion, since any solvent present in the discontinuous phase of the Pickering emulsion will also evaporate, thereby reducing the size of the balls formed. Thus, the (number) average (mean) diameter of the balls is preferably about 5000 µm or less, more preferably about 500 µm or less, and most preferably about 100 µm or less. Generally, the balls have a (number) average diameter of at least about 50 nm, more preferably at least about 100 nm, and most preferably at least about 1 µm.

Thus, the balls may have a size in the range of from about 50 nm to about 5000 µm, preferably from about 100 nm to about 500 µm, more preferably from about 1 to about 100 µm.

Also disclosed herein are polysiloxane elastomer balls coated with a 2D material, which may be formed by the above method.

Preferably, the balls comprise from about 0.1 to about 50 wt. % of the 2D material and from about 50 to about 99.9 wt. % of the polysiloxane elastomer. More preferably, the balls comprise from about 0.5 to about 40 wt. % of the 2D material and from about 60 to about 99.5 wt. % of the polysiloxane elastomer. Most preferably, the balls comprise from about 1 to about 35 wt. % of the 2D material and from about 65 to about 99 wt. % of the polysiloxane elastomer.

The discrete balls discussed above may be used as filler particles in a composite material, and may be combined with any suitable matrix material (e.g. a matrix material that is compatible with the 2D material) to form a composite material.

Thus, also disclosed herein is a method of making a composite material comprising:
(1) incorporating polysiloxane elastomer balls coated with a 2D material into a matrix material.

Also disclosed herein is a method of making a composite material comprising:
(1) forming a Pickering emulsion comprising a continuous liquid phase, a discontinuous liquid phase, and a 2D material; wherein the discontinuous liquid phase comprises a polysiloxane and a curing agent; and
(2) allowing the continuous liquid phase to at least partially evaporate and the polysiloxane to at least partially cure thereby forming polysiloxane elastomer balls coated with a 2D material; and
(3) incorporating the polysiloxane elastomer balls formed in step (2) into a matrix material.

Preferably, step (2) comprises allowing the continuous liquid phase to evaporate and the polysiloxane to at least partially cure, thereby forming polysiloxane elastomer balls coated with a 2D material.

Preferably, step (2) comprises allowing the continuous liquid phase to evaporate and the polysiloxane to fully cure, thereby forming polysiloxane elastomer balls coated with a 2D material.

Step (1) may comprise the process disclosed above for forming a Pickering emulsion.

In step (3), the balls formed in step (2) are added as a filler to a matrix material, thereby forming a composite material of the invention.

Composite materials formed using the polysiloxane elastomer balls described above as the filler material have superior properties to composite materials formed simply by the addition of a 2D material to a matrix material. For example, the pre-assembly of the 2D material on the surface of the balls prevents aggregation of the 2D material, and as such all of the 2D material acts to alter the properties of the composite material.

In addition, when a 'loose' 2D material is added, the 2D material can disperse randomly throughout the whole of the matrix phase. In contrast, in the system described above, where the 2D material is added in the form of 'balls' of polysiloxane elastomer coated with 2D material, the 2D material cannot occupy the volume of the material that is taken up by the polysiloxane elastomer. A continuous network of 2D material can therefore be formed at lower loadings than in random systems. This effect is described in relation to carbon nanotubes in Jurewicz et al. (*J. Phys. Chem. B,* 2011, 115 (20), pp 6395-6400).

Also disclosed herein are composite materials formed by the methods described above.

For example, disclosed herein is a composite material comprising a matrix phase and a plurality of filler particles, wherein said filler particles comprise discrete polysiloxane elastomer balls coated with a 2D material.

Also disclosed herein is a composite material comprising a matrix phase and filler particles, wherein said filler particles are formed by a method comprising:
(1) forming a Pickering emulsion comprising a continuous liquid phase, a discontinuous liquid phase, and a 2D material; wherein the discontinuous liquid phase comprises a polysiloxane and a cross-linking agent;
(2) allowing the continuous liquid phase to at least partially evaporate and the polysiloxane to cure.

For example, the filler particles may be incorporated into a matrix material by a compounding process, for example in an extrusion process where the filler particles are extruded together with the desired matrix phase. Suitable processes and conditions are well known in the art.

The matrix phase into which the filler particles discussed above are incorporated may be selected from any matrix phase which is compatible with the chosen 2D material. Preferably, the matrix phase is polymeric, for example a natural rubber latex, a polyolefin, a polyester, a polyacrylate, or a polysiloxane elastomer. For example, the matrix phase may be a polysiloxane elastomer, wherein the polysiloxane may be the same or different to the polysiloxane in the filler particles.

For example, graphene-coated cured PDMS balls can be added to a PDMS matrix, thereby forming a PDMS composite material containing graphene.

In each of the methods and materials discussed above, the polysiloxane and the 2D material may be selected from any of those discussed herein.

In composite materials comprising the discrete polysiloxane elastomer balls discussed above, the discrete polysiloxane elastomer balls (i.e. the filler particles) may comprise up to about 90 wt. % of the composite material. For example, the filler particles may comprise from about 10 to about 90 wt. % of the composite material, such as from about 20 to about 80 wt. % of the composite material. Alternatively, the filler particles comprise from about 30 to about 70 wt. % of the composite material.

The properties of the composite material will be affected by the nature of the matrix phase and the nature of the filler particles. For example, the nature of the 2D material will affect the properties of the filler particles, and will therefore affect the properties of the composite material.

For example, electrically conductive 2D materials such as graphene may be used to confer electrically conductive properties on the composite material.

In another aspect, the present invention provides a method of making a composite material comprising a continuous matrix phase of polysiloxane elastomer and a network of voids, with the 2D material coating the surface of the polysiloxane surrounding the voids. This type of material is similar in structure to a sponge, or other porous solid material.

This material may be formed by forming a Pickering emulsion containing polysiloxane and a curing agent in the continuous phase, and then allowing the polysiloxane to cure. The discontinuous liquid phase is allowed to evaporate.

This composite material may therefore be formed by a method comprising:
  (1) forming a Pickering emulsion comprising a continuous liquid phase, a discontinuous liquid phase, and a 2D material; wherein the continuous liquid phase comprises a polysiloxane and a curing agent;
  (2) allowing the polysiloxane to at least partially cure.

Step (2) may comprise allowing the polysiloxane to at least partially cure and the discontinuous liquid phase to evaporate. This step may be carried out in an unsealed environment.

Alternatively, the discontinuous liquid phase may become trapped in the composite material in step (2) as the polysiloxane cures. In this case, it will be necessary to distort (e.g. by compressing) the resultant elastomer in order to create a pathway for the trapped discontinuous liquid phase to escape, e.g. by evaporation. The method may therefore further comprise: (3) disrupting the material formed in step (2) to remove any remaining discontinuous liquid phase.

The invention also comprises a composite material formed by the above method.

Uses

The materials of the present invention have a wide variety of uses. For example, as discussed above, the discrete polysiloxane elastomer balls coated with a 2D material can be used as filler particles in a composite material to confer functionality on the composite material.

For example, where the 2D material is electrically conductive (e.g. graphene), the balls may be added to a matrix material to confer electrical conductivity. Such a material may be used as an electrical sensor, or as an anti-static material.

Alternatively or additionally, the polysiloxane elastomer balls may be used to provide mechanical reinforcement to a matrix material.

The discrete polysiloxane elastomer balls described herein may also be used in a water filtration device, where the 2D material (e.g. graphene) may act as a filter.

Where the composite material is formed by leaving the Pickering emulsion in a sealed system, the resultant composite material may be used in a strain gauge.

The electrical properties and strain range of the composite materials of the invention invite their application as strain sensors. Nanocomposites are attractive candidates for next-generation strain sensors due to their elasticity, but widespread adoption by industry has been hampered by nonlinear effects such as hysteresis and creep, making accurate, repeatable strain readouts an ongoing challenge.

The sensitivity of a strain gauge is usually quantified by the relative change in resistance for a given strain. This is also known as the gauge factor, Gr. Commercial strain sensors are typically based on metal foil gauges in which a significant portion of the piece resistivity arises from the changing geometry, according to Poisson's ratio. Accuracy and reliability are preferred over sensitivity and strain range, and such devices generally have a gauge factor (Gr) of about 2 to 6, and typically fracture at 5% strain or less. In contrast, the composite materials formed herein may have a gauge factor of more than 20.

The gauge factor Gr is defined in equation (2) below.

$$G = 1 + 2\nu + \Delta\rho/\rho_0/\Delta\varepsilon = R/R_0\Delta\varepsilon = (1 + R/R_0)/\Delta\varepsilon \quad \text{Equation (2)}$$

where $\nu$ is Poisson's ratio, $\rho$ is the resistivity, $\rho_0$ is the initial resistivity, R is the resistance, $R_0$ is the initial resistance, and $\varepsilon$ is the applied strain.

Thus, in one aspect the present invention provides a strain gauge comprising a composite material formed by a method comprising:
  (1) forming a Pickering emulsion comprising a continuous liquid phase, a discontinuous liquid phase, and a 2D material; wherein the discontinuous liquid phase comprises a polysiloxane and a curing agent;
  (2) leaving the Pickering emulsion formed in step (1) in a sealed system for sufficient time to cure the polysiloxane; and
  (3) allowing any remaining liquid to evaporate.

The strain gauge may be formed by simply attaching electrodes to the composite material, and measuring the current during stretching.

The sensitivity of the strain gauges described herein is sufficiently high that they can be used to track the respiration rates and pulses of people wearing the device. For example, the strain gauge could be incorporated into a 'fitness tracker'-like band, or even embedded within the fabric of an item of clothing such as a baby sleep suit. Such devices can provide a comfortable, non-invasive way to monitor the breathing and heart rate of a subject. This can be useful in any area where it is desirable to monitor respiration and heart rates, for example to monitor sleep apnea, heart and respiration rates during exercise, or the breathing and heart rate of babies.

The composite materials described herein may also be used as a pressure sensor. The materials are suitable for use as a pressure sensor for similar reasons that they are useful as a strain sensor, e.g. due to their electrical properties.

The composite materials described herein may also be used as electrodes for energy storage devices such as supercapacitors and batteries.

Alternatively, the composite material comprising a continuous matrix phase containing a network of voids may be used as a sponge-like material to soak up oil. Oil will bind to the composite while water will not, and these materials could therefore be used to help clean up oil spills in the ocean.

EXAMPLES

Materials

A two-component product (QSIL 216) containing PDMS and a platinum curing agent was purchased from Farnell UK.

Graphene powder (CAS: 1034343-98-0) was purchased from Thomas Swan & Co. Ltd. (Elicarb Premium Grade Graphene Powder).

Dichloromethane, ethyl acetate, and ethylene glycol were purchased from Sigma Aldrich.

Reference Example 1—Formation of a Pickering Emulsion 22 mg of graphene powder was sonicated in 4.98 g (3.76 mL) of dichloromethane (DCM) at or below 10° C. for one hour to disperse the graphene in the DCM.

Separately, 2 mL of QSIL 216 (containing PDMS (1.75 g) and a curing agent (0.175 g) in a 10:1 weight ratio) was mixed with 2.02 g (2.24 mL) of ethyl acetate (EA).

The DCM containing the graphene particles was then added to the mixture of PDMS, curing agent and ethyl acetate and homogenised via vigorous shaking for 30 seconds. The total volume of the mixture formed was 8 mL.

13.36 g (12 mL) of ethylene glycol was then added, such that the ratio of ethylene glycol to DCM/EA/PDMS/curing agent was 60:40 by volume. Shear mixing was then carried out at 10,000 rpm for 2 minutes to form Sample 1.

The above procedure was repeated using the amounts of graphene shown in Table 2 below to form Samples 2-12.

TABLE 2

| Sample Number | Mass of graphene (mg) | vol. % of graphene with respect to volume of QSIL 216 | wt. % of graphene with respect to weight of QSIL 216 |
| --- | --- | --- | --- |
| 1 | 22 | 0.50 | 1.14 |
| 2 | 45 | 0.99 | 2.25 |
| 3 | 89 | 1.94 | 4.41 |
| 4 | 178 | 3.72 | 8.45 |
| 5 | 267 | 5.35 | 12.16 |
| 6 | 356 | 6.85 | 15.58 |
| 7 | 445 | 8.25 | 18.74 |
| 8 | 534 | 9.54 | 21.68 |
| 9 | 623 | 10.74 | 24.41 |
| 10 | 712 | 11.86 | 26.96 |
| 11 | 801 | 12.91 | 29.34 |
| 12 | 890 | 13.89 | 31.57 |

Reference Example 2—Formation of Filler Particles

The Pickering emulsions formed in Example 1 were re-homogenised via shaking for 30 seconds and pipetted into glass petri-dishes.

Petri-dishes containing the emulsions were placed in an oven at 30° C. for 1 hour before raising the temperature by 10° C. every hour until 70° C. was reached and subsequently maintained overnight.

A SEM image of filler particles formed by this method are shown in FIG. 6.

Example 3—Formation of a Composite Film

The Pickering emulsions formed in Example 1 were allowed to stand for 95 days in sealed containers before being re-homogenised via shaking for 30 seconds and pipetted into glass petri-dishes.

Petri-dishes containing the emulsions were placed in an oven at 30° C. for 1 hour before raising the temperature by 10° C. every hour until 70° C. was reached and subsequently maintained overnight.

A SEM image of a composite film formed by this method is shown in FIG. 5.

Example 4—Conductivity

The composite films formed in Example 3 were tested for their conductivity. Results of the conductivity vs. graphene loading level plotted in FIG. 7.

Figure 7:
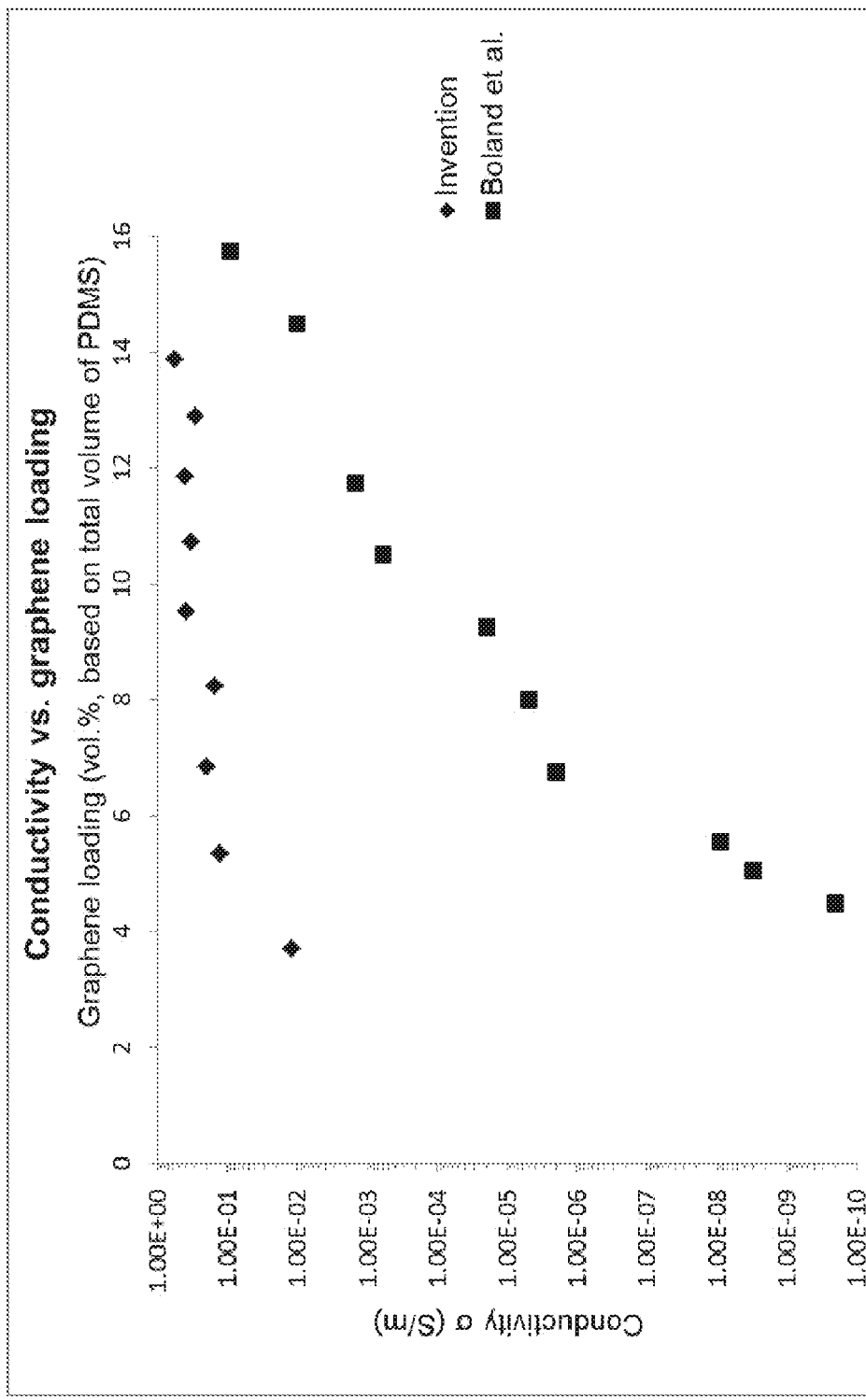
FIG. 7 is a plot of conductivity against graphene loading level for a material of the invention and a material known in the art.

Also potted in FIG. 7 is the conductivity vs. graphene loading of a composite material formed in accordance with Boland et al. (*Science*, 2016, Vol. 354, issue 6317, pp 1257-1260).

As can be seen from FIG. 7, the composite material of the present invention shows a significantly higher conductivity at the same graphene loading level than the material formed by Boland et al.

Without wishing to be bound by theory, it is believed that this is at least partially due to the process of the present invention providing control over the orientation of the 2D material, because the 2D material is ordered in the Pickering emulsion before the composite is made. The composites formed by the methods of the present invention therefore contain 2D material having a high degree of alignment. In contrast, the process disclosed in Boland et al. results in graphene having a random orientation within the composite material, resulting in a lower ultimate conductivity.

In addition, the segregated nature of the network of 2D material in the composite of the present invention means that all graphene contributes to the conductivity of the composite. In contrast, in a composite where 'loose' graphene is added (e.g. as in Boland et al.), there will be some aggregated graphene forming unconnected clusters, which do not contribute to the overall conductivity. This results in a lower conductivity in the material formed in Boland et al. at any given graphene loading level. The material of the present invention can therefore achieve high conductivity at low loadings of 2D material.

Example 5—Strain Sensor

The electrical properties of composite films formed in accordance with Example 3 were measured as they were strained until failure using a mechanical testing stage (Texture Analyser, Stable Microsystems) and a Keithley 2126B probe station.

Silver electrodes were painted on the ends of samples of the composite films which were approximately 5-7 mm wide and 25-30 mm long. Metal clamps used to hold each sample in the mechanical testing stage were insulated using sandpaper, and each sample was connected to the probe station via crocodile clips attached to tin foil strips clamped against the silver painted ends.

The electrical resistance was then measured as the composite was strained, and changes in resistance were related to the applied strain.

Figure 8:
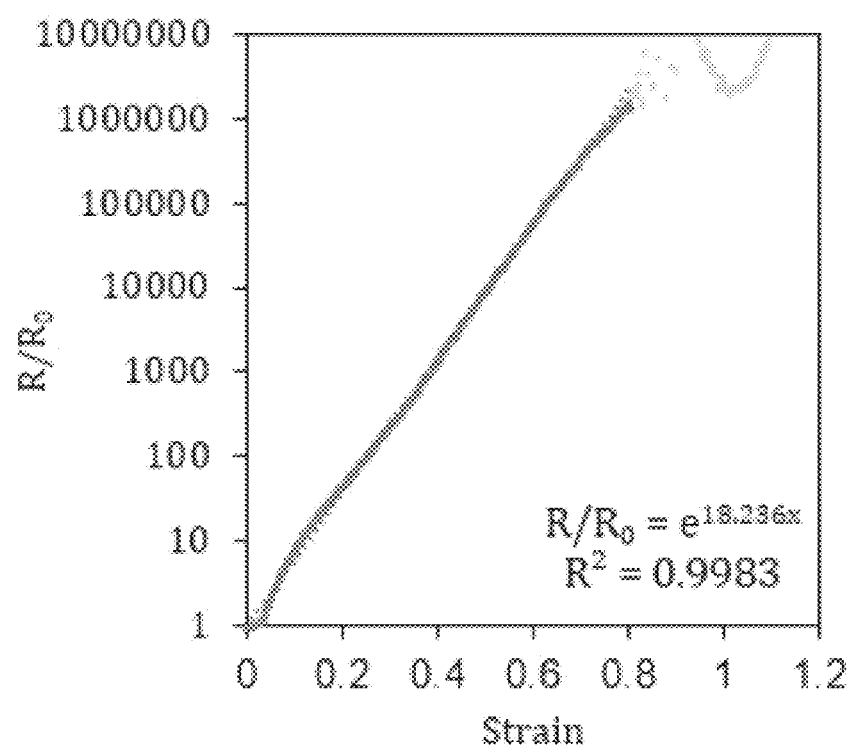
FIG. 8 is a plot of $R/R_0$ as a function of strain time for a strain sensor of the invention.

FIG. 8 depicts $R/R_0$ as a function of strain (x) for a composite made from Sample 12 when strained to failure. R=resistance, $R_0$=initial resistance.

Plotting $R/R_0 = e^{Gx}$ with G=18.3 and x=applied strain provides an excellent fit, holding up to >80% strain.

It was found that the exponential is well-defined at larger strains (unlike most linear gauge factors). In addition, characterisation of the electromechanical properties over a wide range of samples and loading levels revealed a response consistent enough to be calibrated. The composites of the invention are therefore capable of measuring, rather than simply sensing, strain.

The composite films tested were able to withstand >1000 cycles at 36% strain and >100 cycles at 74% strain before failure.

When compared to both linear and nonlinear strain sensors in the literature, the sensor tested herein exhibited the largest absolute change in resistance reported. This is attributed to the efficient packing and distribution of the nanosheets, enabling excellent conductivity at lower loading levels and reducing the impact on the working strain range.

Example 6—Formation and Testing of Composite Films

Five identical oil-in-water emulsions were made using the method set out in Example 1 with 7.3 vol. % of graphene with respect to volume of QSIL 216.

These emulsions were each allowed to stand in a sealed environment for from 21 to 501 hours, before being poured into glass Petri dishes and cured through incremental increases in temperature as described in Example 3.

Figure 9:
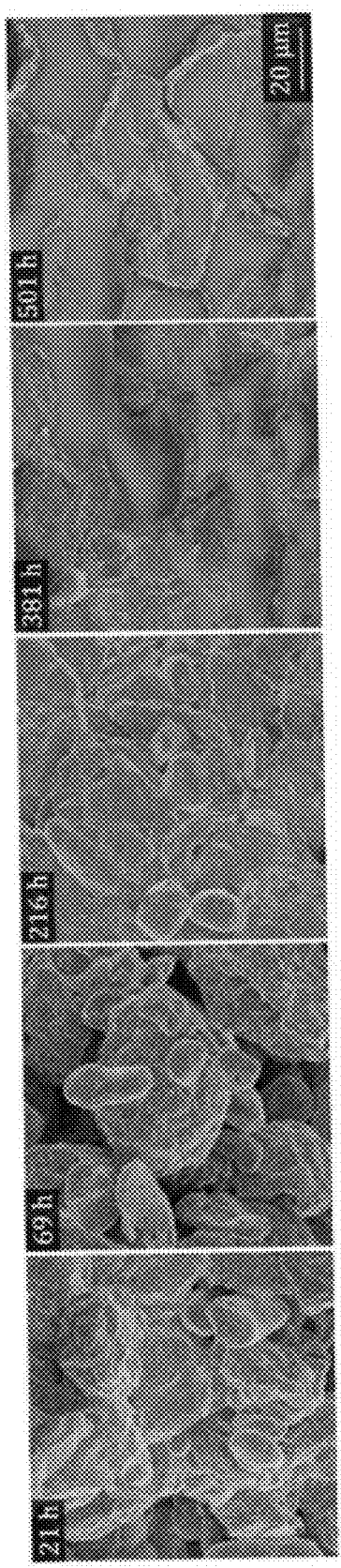
FIG. 9 is a series of SEM images showing the formation of the composite material of the invention.

SEM (Zeiss SIGMA field-emission gun SEM) microscopy and Raman spectroscopy (Renishaw inVia) microscopy were performed on stress-fractured cross-sections. The results are shown in FIG. 9, which shows the transition from elastomer balls to the composite films of the invention as the standing (or interdiffusion) time increased.

As discussed above, the change in the composition of the composite material with increased standing or interdiffusion time is attributed to the fact that, given sufficient time, polymer chains are likely able to diffuse through the graphene shell and into neighbouring droplets, eventually leading to a macroscopically continuous film.

Whilst the ratio of PDMS to curing agent (10:1) greatly affects the degree of crosslinking, it is expected that the emulsion formation and diffusivity of the polymer is dominated by the viscosity of the oil phase at room temperature. One strategy to reduce the interdiffusion time (i.e. the time for which the emulsion is left to stand in a sealed system) is to use a lower molecular weight PDMS with a reduced viscosity and higher diffusion coefficient.

Figure 10:
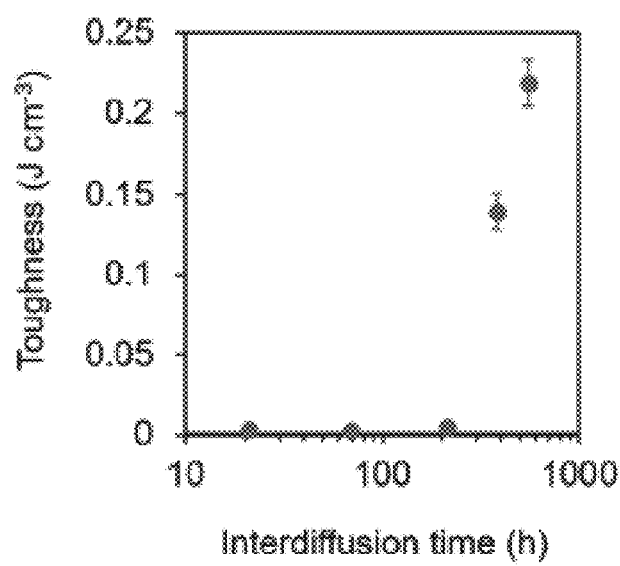
FIG. 10 shows toughness versus interdiffusion time for a material formed according to a method of the invention.

FIG. 10 shows the toughness of the various composite films versus interdiffusion time. As can be seen from FIG. 10, the mechanical toughness only increases drastically once a significant proportion of chains have diffused beyond the graphene shell, enabling interdroplet crosslinking and changing the dominant failure mechanism from overcoming van der Waals adhesion to chain pull-out or scission.

Figure 11:
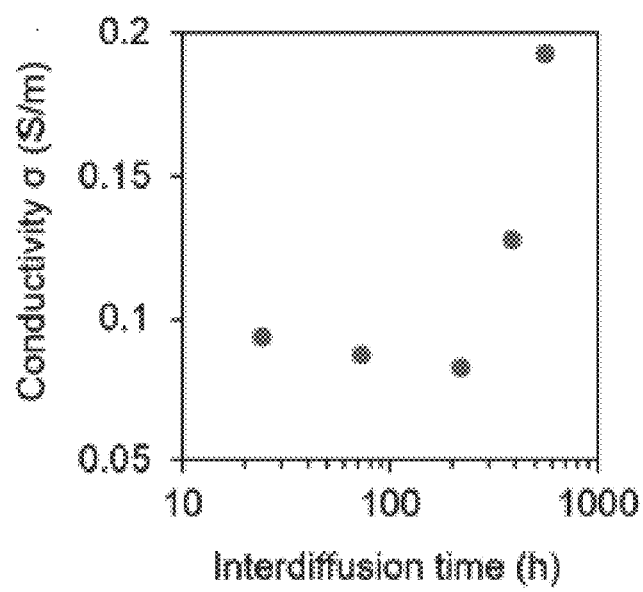
FIG. 11 shows conductivity versus interdiffusion time for a material formed according to a method of the invention.

A doubling in conductivity upon the densification of the elastomer balls into a continuous film has also been observed, as shown in FIG. 11 (which shows conductivity versus interdiffusion time). This is attributed to the elimination of the void space between the elastomer balls increasing the electrical contact area between nanosheets and reducing the porosity of the composite film.

Example 7—Comparison with a Randomly Distributed Composite

The morphology of the conductive network in the composite materials of the invention, visible in the SEM of fractured cross-sections shown in FIG. 9, is considerably different from the graphene networks found in traditional randomly distributed composites. By virtue of the production method, the graphene is strongly confined at droplet interfaces in the liquid system, meaning that the network structure is preserved after curing. As such, with the graphene sheets all being confined to close proximity, it is intuitive that electrical junctions will be of higher quality due to the reduced tunnelling distance between nearest neighbours. In contrast, in random percolating networks, a significant portion of the conductive filler does not contribute to the conducting path near the percolation threshold, resulting in a negligible contribution to macroscopic conductivity and inefficient use of the material, by comparison to the present system.

Furthermore, assembling the graphene network into a reduced volume (i.e. at the oil-water interface) reduces the total filler required to achieve macroscopic conductive pathways, while interfacial tension aligns the graphene sheets to the tangent of the droplet surface. Both act to increase the number of conductive junctions and improve the quality of those junctions through superior intersheet contact when compared to randomly distributed networks.

This is the reason that the composite material of the present invention shows a significantly higher conductivity at the same graphene loading level than the material formed by Boland et al. (where the 2D material is randomly distributed and orientated through the matrix), as shown in FIG. 7 and discussed in Example 4.

Figure 12:
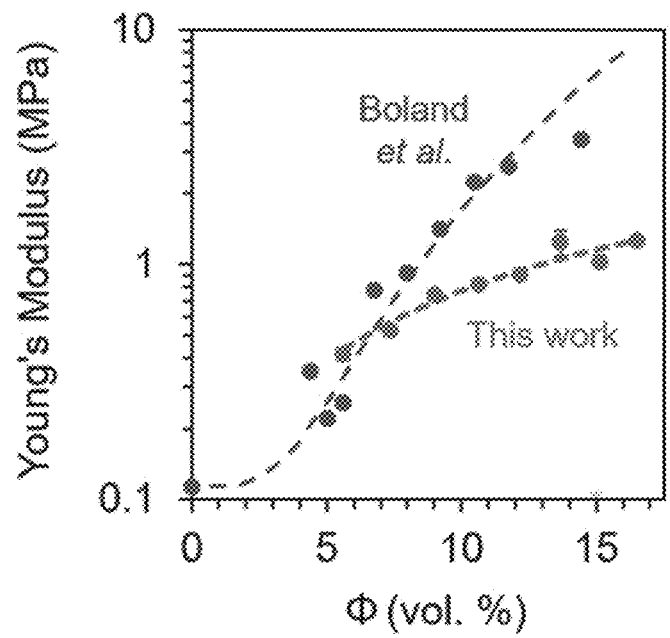
FIG. 12 shows the Young's modulus of various composites of the invention as a function of graphene loading.
Figure 13:
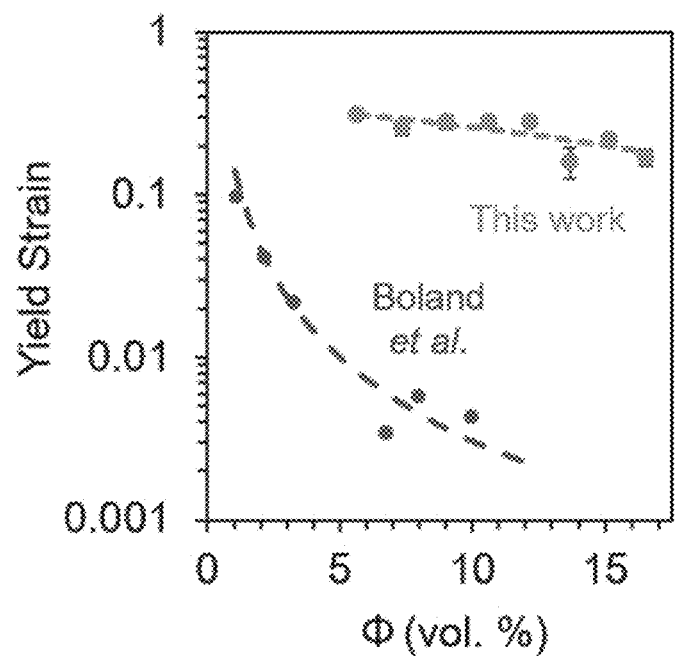
FIG. 13 shows the yield strain of various composites of the invention as a function of graphene loading.

Further comparisons between the composite material of the present invention and the material formed by Boland et al. are shown in FIGS. 12 and 13.

FIG. 12 plots the Young's modulus of various composite films formed according to the method set out in Example 3 as a function of graphene loading, and shows a linear trend over the range of the data. The data for the random composites disclosed in Boland et al. is plotted for comparison. A much greater increase of modulus with loading level is observed for the composites of Boland et al. It is important to note that nanocomposites used for strain sensing need to remain sufficiently soft that they comply with the surface being measured, e.g. human skin. As such, the much weaker dependence of modulus on loading level observed in the composites of the present invention may prove beneficial to the design of on-skin sensors.

In contrast to the lower Young's modulus observed in the presently claimed composites compared to those disclosed in Boland et al., FIG. 13 shows that the composites of the present invention have a significantly higher yield strain than those of Boland et al. The yield strain is near constant, though both systems exhibit a decrease with increasing graphene content. Viscoelastic sensors with a significant viscous component will not recover once strained beyond the yield point. However, since the sensors of the present invention are highly elastic, it is possible to operate the materials over a much wider strain range.

The structure of the presently claimed composites, as highlighted in FIG. 9, consists of shells of graphene surrounding pristine PDMS "cores". These shells, which are interdiffused with PDMS chains, are responsible for increasing the Young's modulus (by virtue of interfacial stress transfer between the matrix and graphene).

Example 8—Bodily Motion Sensing

Figure 14:
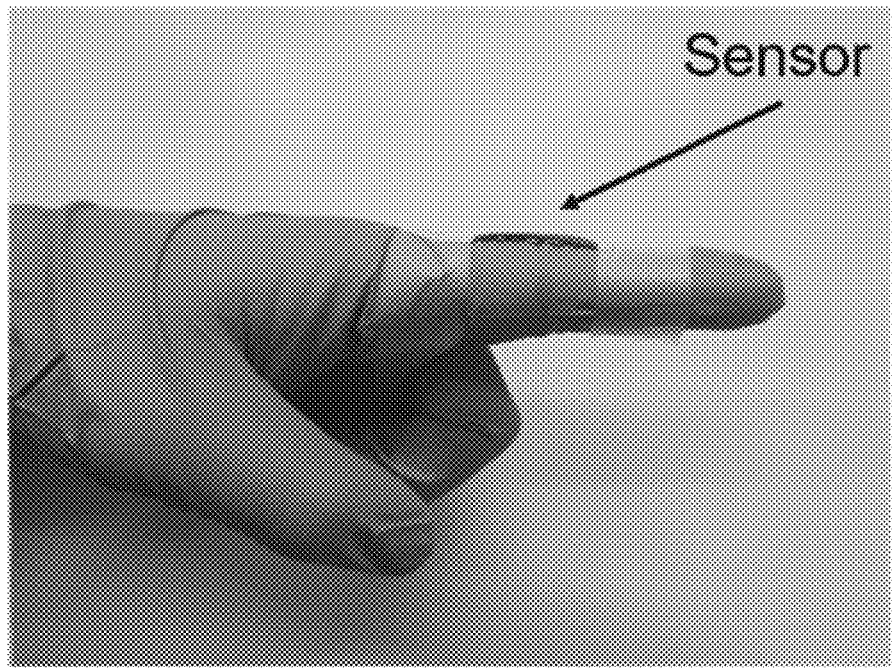
FIG. 14 shows a strain sensor of the invention in a relaxed state.
Figure 15:
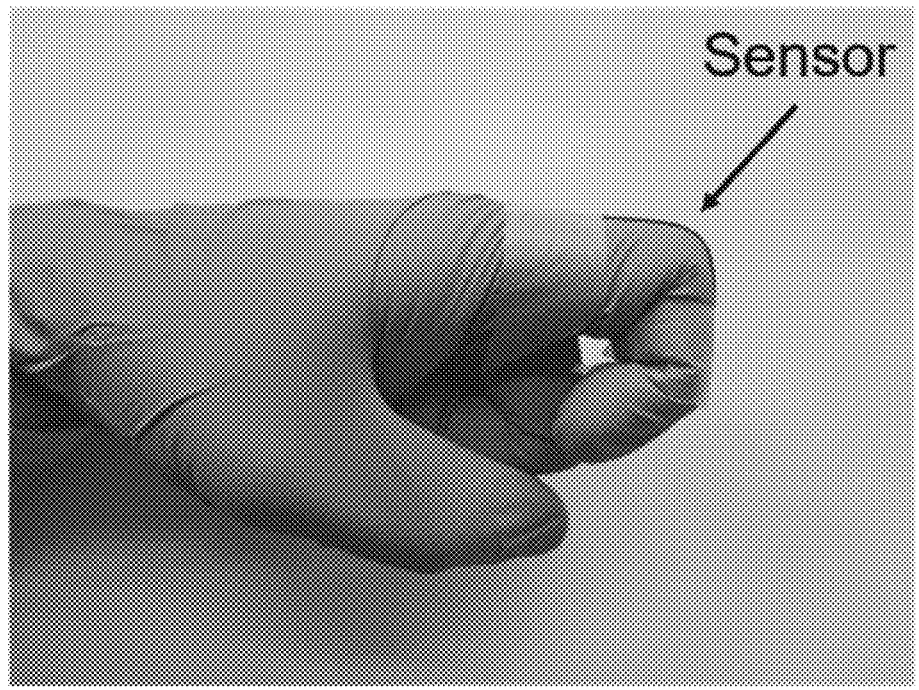
FIG. 15 shows a strain sensor of the invention when extended.

Strain scenarios specific to the human body, including finger bending, pulse and breathing were applied to the stain sensor formed in Example 5, with the electrical response examined. FIGS. 14 and 15 shows the sensor in a relaxed state when taped to the index finger (FIG. 14), and in a strained state under maximum bending (FIG. 15).

Figure 16:
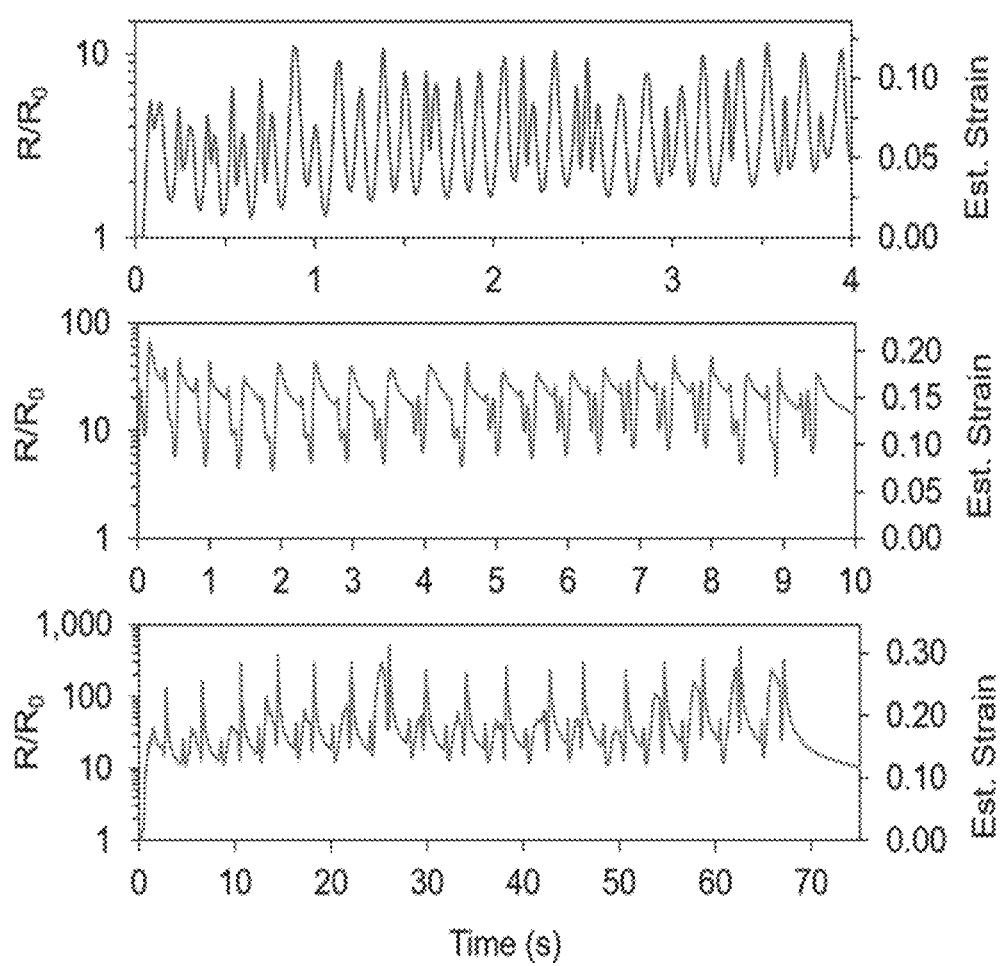
FIG. 16 shows the electrical response of a strain sensor of the invention when extended.

In FIG. 16, the electrical response to multiple fingers bends over a small (<10°), medium (approximately 45°) and large (approximately 90°) bending radius is shown (top, middle and bottom respectively). When fully relaxed, the sensor is approximately 4 cm in length, rising to approximately 5 cm under large bending, or approximately 25% strain.

Figure 17:
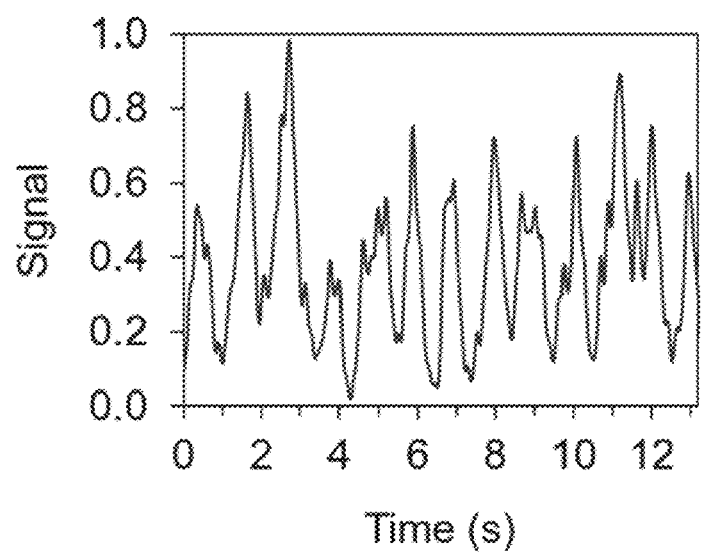
FIG. 17 shows the electrical response when a strain sensor of the invention was pressed against the carotid artery.
Figure 18:
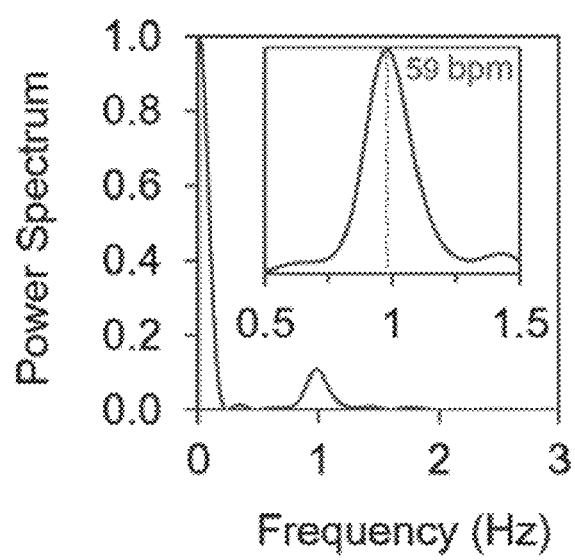
FIG. 18 shows a Fourier transform of FIG. 17.

The sensor was then placed on both the neck and chest of a human subject while the electrical response was recorded. When the sensor was gently pressed against the carotid artery, the pulse was clearly detectable (FIG. 17) with a narrow peak at 59 bpm extracted from the Fourier transform (FIG. 18).

Figure 19:
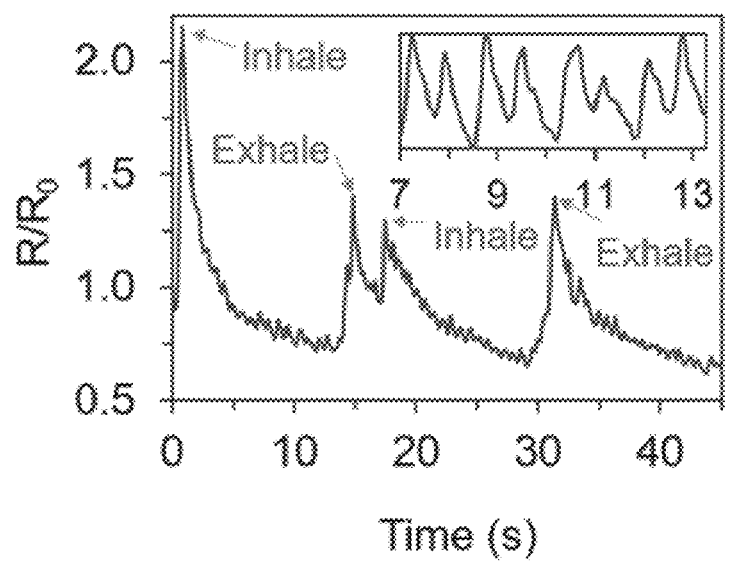
FIG. 19 shows the electrical response when a strain sensor of the invention was pressed against the chest.
Figure 20:
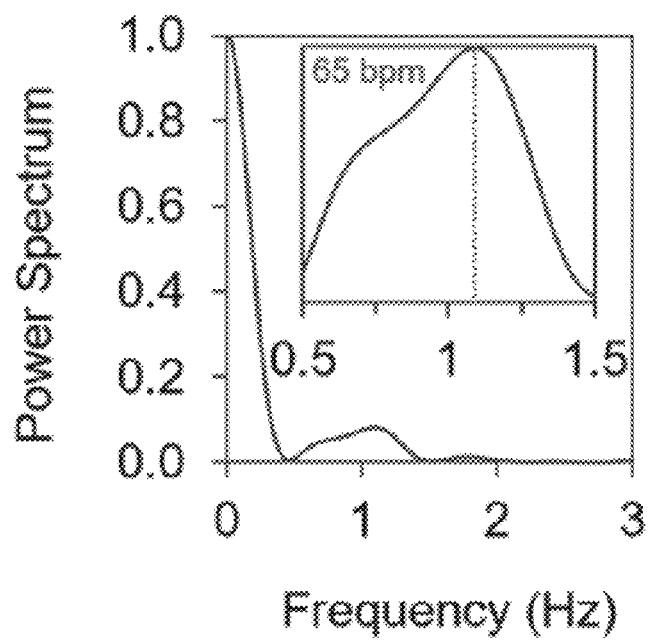
FIG. 20 shows a Fourier transform of FIG. 19.

When placed on the chest, the sensor was able to sense both highstrain, low-frequency modes associated with breathing and high-frequency, low-strain modes associated with a pulse (see FIG. 19). The fact that the pulse signal is easily discernible over the breathing mode speaks to the versatility of the device and its potential as a biomedical sensor. Inset to FIG. 19 is the pulse waveform once the breathing induced baseline drift is removed. This is also subject to a Fourier transform, revealing a maximum at 65 bpm (FIG. 20), typical of a resting heart rate.

The invention claimed is:

1. A method of making a composite material, the method comprising:
   (1) forming a Pickering emulsion comprising a continuous liquid phase, a discontinuous liquid phase, and a 2D material; wherein the discontinuous liquid phase comprises a polysiloxane and a curing agent;
   (2) leaving the Pickering emulsion formed in step (1) in a sealed system for sufficient time to at least partially cure the polysiloxane; and
   (3) allowing any remaining liquid to evaporate
   wherein the composite material comprises a matrix phase of polysiloxane elastomer and a network of dispersed 2D material.

2. The method of claim 1, wherein the 2D material is graphene, hexagonal boron nitride, phosphorene or a transition metal dichalcogenide.

3. The method of claim 2, wherein the 2D material is graphene.

4. The method of claim 1, wherein the polysiloxane is a compound of Formula (I) or Formula (II):

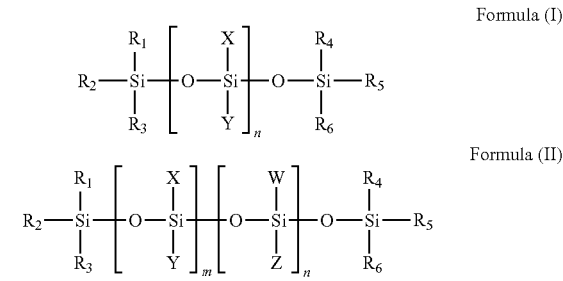

wherein:
   each of $R_1$, $R_2$, $R_3$, $R_4$, $R_5$ and $R_6$ is independently H or an organic group;
   X is an organic group;
   Y is H or an organic group;
   W is an organic group;
   Z is H or an organic group; and
   and n and m are each any integer greater than 1.

5. The method of claim 4, wherein the polysiloxane is PDMS.

6. The method of claim 1, wherein the continuous liquid phase comprises glycerol, water, formamide, diethylene glycol, ethylene glycol, propylene glycol, or combinations thereof.

7. The method of claim 6, wherein the continuous liquid phase comprises water, propylene glycol, ethylene glycol, or combinations thereof.

8. The method of claim 1, wherein the discontinuous liquid phase further comprises a solvent selected from the group consisting of hexane, acetone, tetrahydrofuran, chlorobenzene, diethyl ether, ethyl acetate, toluene, xylene, pentanol, butanol, propanol, ethanol, methanol, chloroform, acrylonitrile, dichloromethane, and combinations thereof.

9. The method of claim 8, wherein the solvent is selected from the group consisting of ethyl acetate, dichloromethane and combinations thereof.

10. The method of claim 1, wherein step (2) comprises leaving the Pickering emulsion in a sealed system for at least 24 hours.

11. The method of claim 10, wherein step (2) comprises leaving the Pickering emulsion in a sealed system for at least 7 days.

12. The method of claim 1, wherein step (3) comprises leaving the product of step (2) in an unsealed system for at least about 1 hour.

13. The method of claim 1, wherein step (3) comprises leaving the product of step (2) in an unsealed system at a temperature of from about 30° C. to about 70° C.

14. The method of claim 1, wherein the Pickering emulsion is formed by a method comprising:
   (1a) exfoliating a layered 3D material in a solvent to produce particles of a 2D material;
   (1b) forming a dispersion of the particles of the 2D material in a first liquid phase; and
   (1c) adding a second liquid phase and homogenising the dispersion of the 2D material in the first liquid phase with the second liquid phase thereby forming a Pickering emulsion comprising a continuous liquid phase, a discontinuous liquid phase, and the 2D material.

15. The method of claim 14, wherein the polysiloxane and curing agent are present in the first liquid phase.

16. A composite material obtainable by or formed by the method of claim 1.

17. A strain sensor comprising the composite material of claim 16.

18. A pressure sensor comprising the composite material of claim 16.

19. A method of making a composite material, the method comprising:
  (1) forming a Pickering emulsion comprising a continuous liquid phase, a discontinuous liquid phase, and a 2D material; wherein the continuous liquid phase comprises a polysiloxane and a curing agent;
  (2) allowing the polysiloxane to at least partially cure.

20. A Pickering emulsion comprising a continuous liquid phase, a discontinuous liquid phase, and a 2D material; wherein the continuous liquid phase comprises a polysiloxane and a curing agent.

* * * * *